(12) United States Patent
Walker et al.

(10) Patent No.: US 7,818,284 B1
(45) Date of Patent: Oct. 19, 2010

(54) METHOD AND APPARATUS FOR PROVIDING CROSS-BENEFITS VIA A CENTRAL AUTHORITY

(75) Inventors: Jay S. Walker, Ridgefield, CT (US); Daniel E. Tedesco, New Canaan, CT (US); Stephen C. Tulley, Stamford, CT (US); John M. Packes, Hawthorne, NY (US); Deirdre O'Shea, New York, NY (US); Keith Bemer, New York, NY (US); James A. Jorasch, Stamford, CT (US); Dean P. Alderucci, Ridgefield, CT (US); Magdalena Mik, Greenwich, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/274,281

(22) Filed: Mar. 22, 1999

Related U.S. Application Data

(63) Continuation-in-part of application No. 09/219,267, filed on Dec. 23, 1998, which is a continuation-in-part of application No. 08/943,483, filed on Oct. 3, 1997, now abandoned, which is a continuation-in-part of application No. 08/923,683, filed on Sep. 4, 1997, now Pat. No. 6,553,346, which is a continuation-in-part of application No. 08/889,319, filed on Jul. 8, 1997, now Pat. No. 6,085,169, which is a continuation-in-part of application No. 08/707,660, filed on Sep. 4, 1996, now Pat. No. 5,794,207, and a continuation-in-part of application No. 09/100,684, filed on Jun. 19, 1998, now Pat. No. 6,898,570, which is a continuation-in-part of application No. 08/982,149, filed on Dec. 1, 1997, now Pat. No. 6,196,458, and a continuation-in-part of application No. 08/994,426, filed on Dec. 19, 1997, now Pat. No. 6,694,300, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
G06F 17/00 (2006.01)

(52) U.S. Cl. ............. 707/102; 707/101; 707/104.1
(58) Field of Classification Search ............. 705/1, 705/14, 40, 26, 401, 408, 10, 16, 217; 379/88.22
See application file for complete search history.

(56) References Cited

U.S. PATENT DOCUMENTS 4,247,759 A  1/1981  Yuris et al.

(Continued)

FOREIGN PATENT DOCUMENTS

EP   0 109 189 A1   5/1984

(Continued)

OTHER PUBLICATIONS

Rozen, Miriam, "What's New in Joint Promotions", The New York Times, Mar. 10, 1985, Section 3, col. 1, Financial Desk, p. 23.

(Continued)

*Primary Examiner*—Sana Al-Hashemi
(74) *Attorney, Agent, or Firm*—Fincham Downs LLC

(57) ABSTRACT

A controller is in communication with a plurality of vendors that are servicing customers, as well as with a plurality of "subsidizing" vendors seeking access to those customers. The controller receives from a first vendor an indication of one or more items that a customer is to purchase. In response, the controller transmits, on behalf of a subsidizing vendor, an indication of an offer for a subsidy such as a reduction in the customer's purchase price. If the customer accepts the offer, the controller provides an amount of funds from the subsidizing vendor to the first vendor. The controller may also retain a portion of the amount as payment. The controller also facilitates a transaction between the customer and the subsidizing vendor. For example, the customer may be required to sign up for a service (e.g. credit card account service) that is provided by the subsidizing vendor. By having the controller manage such a system by acting between subsidizing vendors and vendors that are servicing customers, a vendor need only communicate with the controller, rather than a plurality of other vendors.

30 Claims, 25 Drawing Sheets

U.S. PATENT DOCUMENTS

| | | | |
|---|---|---|---|
| 4,491,725 A | 1/1985 | Pritchard | |
| 4,500,880 A | 2/1985 | Gomersall et al. | |
| 4,667,292 A | 5/1987 | Mohlenbrock et al. | |
| 4,750,119 A | 6/1988 | Cohen et al. | |
| 4,982,346 A | 1/1991 | Girouard et al. | |
| 5,003,384 A | 3/1991 | Durden et al. | |
| RE34,380 E | 9/1993 | Sleevi | |
| 5,287,268 A | 2/1994 | McCarthy | |
| 5,319,542 A | 6/1994 | King et al. | |
| 5,333,186 A | 7/1994 | Gupta | |
| RE34,954 E | 5/1995 | Haber | |
| 5,420,606 A | 5/1995 | Begum et al. | 345/156 |
| 5,434,394 A | 7/1995 | Roach et al. | |
| 5,570,417 A | 10/1996 | Byers | 379/115 |
| 5,619,558 A | 4/1997 | Jheeta | |
| 5,642,279 A | 6/1997 | Bloomberg et al. | |
| 5,652,784 A | 7/1997 | Blen et al. | |
| 5,666,649 A | 9/1997 | Dent | 455/445 |
| 5,673,317 A | 9/1997 | Cooper | 380/23 |
| 5,694,551 A | 12/1997 | Doyle et al. | |
| 5,710,887 A * | 1/1998 | Chelliah et al. | 705/26 |
| 5,717,860 A | 2/1998 | Graber et al. | 395/200.12 |
| 5,721,827 A * | 2/1998 | Logan et al. | 709/217 |
| 5,724,521 A | 3/1998 | Dedrick | |
| 5,727,153 A | 3/1998 | Powell | 395/214 |
| 5,734,838 A | 3/1998 | Robinson et al. | 395/214 |
| 5,752,238 A | 5/1998 | Dedrick | |
| 5,761,648 A | 6/1998 | Golden et al. | 705/14 |
| 5,774,868 A | 6/1998 | Cragun et al. | 705/10 |
| 5,794,207 A | 8/1998 | Walker et al. | |
| 5,794,210 A | 8/1998 | Goldhaber et al. | |
| 5,794,220 A | 8/1998 | Hunt | 705/40 |
| 5,794,221 A | 8/1998 | Egendorf | |
| 5,806,044 A | 9/1998 | Powell | 705/14 |
| 5,812,769 A | 9/1998 | Graber et al. | 395/200.12 |
| 5,819,092 A | 10/1998 | Ferguson et al. | |
| 5,822,736 A | 10/1998 | Hartman et al. | 705/1 |
| 5,825,881 A | 10/1998 | Colvin, Sr. | |
| 5,839,119 A | 11/1998 | Krsul et al. | 705/39 |
| 5,848,396 A | 12/1998 | Gerace | |
| 5,855,008 A | 12/1998 | Goldhaber et al. | 705/14 |
| 5,857,175 A | 1/1999 | Day et al. | 705/14 |
| 5,864,822 A | 1/1999 | Baker, III | |
| 5,870,030 A | 2/1999 | DeLuca et al. | 340/825.44 |
| 5,873,068 A | 2/1999 | Beaumont et al. | 705/14 |
| 5,873,069 A | 2/1999 | Reuhl et al. | 705/20 |
| 5,884,292 A | 3/1999 | Baker et al. | 705/403 |
| 5,890,135 A | 3/1999 | Powell | 705/14 |
| 5,893,075 A | 4/1999 | Plainfield et al. | 705/14 |
| 5,918,211 A * | 6/1999 | Sloane | 705/16 |
| 6,014,634 A | 1/2000 | Scroggie et al. | |
| 6,049,778 A | 4/2000 | Walker | |
| 6,052,730 A | 4/2000 | Feliciano | |
| 6,055,513 A * | 4/2000 | Katz et al. | 705/26 |
| 6,332,128 B1 | 12/2001 | Nicholson | 705/14 |
| 6,336,099 B1 * | 1/2002 | Barnett et al. | 705/14 |
| 6,393,407 B1 | 5/2002 | Middleton | |
| 6,965,870 B1 | 11/2005 | Petras | |
| 7,225,142 B1 * | 5/2007 | Apte et al. | 705/14 |
| 2001/0014868 A1 | 8/2001 | Herz et al. | |

FOREIGN PATENT DOCUMENTS

| | | |
|---|---|---|
| EP | 0 809 202 | 11/1997 |
| EP | 0 902 381 | 3/1999 |
| JP | 405257950 A | 10/1993 |
| JP | 5759101 | 6/1998 |
| WO | WO 95/03570 | 2/1995 |
| WO | WO 96/36926 | 11/1996 |
| WO | WO 97/20279 | 6/1997 |
| WO | WO 97/35441 | 9/1997 |
| WO | WO 98/06050 | 2/1998 |
| WO | WO 96/31848 | 7/1998 |
| WO | WO 99/66438 | 12/1999 |
| WO | WO 99/66443 | 12/1999 |
| WO | WO 00/21004 | 4/2000 |
| WO | WO 01/08025 | 6/2000 |
| WO | WO 00/39720 | 7/2000 |

OTHER PUBLICATIONS

Royall, Katcher, P., "Getting products to consumers; The Basics of Retailing, part 2", Automotive Marketing, May 1990, Section: vol. 19, No. 5, p. 34, ISSN: 0193-3264.

Booker, Ellis, "Checkout lines to offer more than just candy and waiting", Computerworld, May 21, 1990, Section: PCs & Workstations, p. 47.

Shaw, Robert, "How the Smart Card is Changing Retailing", Long Range Planning, 1991, vol. 24, No. 1, pp. 111-114.

"Checkstands Boost Supermarket Profits", Chain Store Age Executive, Dec. 1991, pp. 15B-16B.

"Set-top 'Converge'; Interactive Initiatives Abound at NCTA Convention", Communications Daily, Jun. 10, 1993, Section: Vo. 13, No. 111, p. 9.

Mandese, Joe, "Interactive puts radio at crossroads; Out-of-home role, tapping into digital tech could ensure future", Advertising Age, Oct. 25, 1993, Section: News, p. 12.

Rosenberg, Joyce M., "GE Capital Comes to Macy's Aid Again", AP Worldstreern, Feb. 17, 1994, Section: Financial pages.

Patch, Kimberly, "Sled InterNIC debut Internet services", PC Week, May 16, 1994, Section: vol. 11, No. 19, p. 130, ISSN: 0740-1604.

Ratcliffe, Mitch, "Lucie; interactive information, advertising stands upright, prepares to walk", Digital Media, Jun. 8, 1994, Section: No. 1, vol. 4, p. 14, ISSN: 1056-7038.

Armstrong, Larry, "Coupon Clippers, Save Your Scissors", Business Week, Jun. 20, 1994, Section: Information Processing, No. 3377, p. 164.

Bowles, Bob et al., "ADSI: maximizing the synergy between the network and terminals; analog display services interface", Telephony, Aug. 29, 1994, Section: vol. 227, No. 9, ISSN: 0040-2656.

Ratcliffe, Mitch, "All roads lead to Microsoft? Microsoft's 'Windows everywhere' strategy", Digital Media, Mar. 6, 1995, Section: No. 10, vol. 4, p. 3, ISSN: 1056-7038.

Meece, Mickey, "Big Finance Companies May Want Piece of Limited's Private-Label Card Program", The American Banker, Apr. 12, 1995, Section: Credit/Debit/ATMs, p. 8.

Various telecommunications-related articles in Communications Daily, May 15, 1996, vol. 16, No. 95, p. 4.

Nolle, Tom, "Overcoming cellular déjà vu; personal communications services", America's Network, Sep. 15, 1996, Section: No. 18, vol. 100, p. 70, ISSN: 1075-5292.

Meece, Mickey, "MasterCard, Retailers Testing Point of Sale Discounts Program", The American Banker, Sep. 24, 1996, Section: Credit/Debit/ATMs, p. 14.

Fickenscher, Lisa, "Amex to Start Free Rewards Program with Discounts on Merchandise", The American Banker, Oct. 18, 1996, Section: Credit/Debit/ATMs, p. 10.

"Battle of the bogoff: Roderick Oram on a clash between retailers and manufacturers", Financial Times (London), Oct. 24, 1996, Section: Management: Marketing and Advertising, p. 14.

Fitzgerald, Kate, "Amex Program Moves Loyalty to Next Level . . . ", Advertising Age, Nov. 4, 1996, Section: News p. 2.

Wessel, Harry, "Rewarding Experience?; Credit Cards Offering Bonuses Not for Everyone", Chicago Tribune, Nov. 4, 1996, Section: Your Money, p. 1, Zone C.

"AT&T Wireless adds convenience to buying cellular service", M2 Presswire, Nov. 20, 1996.

"Merger Creates Alliance Data.", Credit Risk Management Report, Dec. 16, 1996, Section: vol. 6, No. 25.

Beyer, Leslie, "Target marketing made easy; supermarkets", Grocery Marketing, Feb. 1997, Section: No. 2, vol. 63, p. 45, ISSN: 0888-0360.

Fickenscher, Lisa, "Merchant: American Express Seeks to Mine Its Data on Cardholder Spending Patterns", The American Banker, Mar. 24, 1997, Section: Credit/Debit/ATMs, p. 20.
Warner, Bernhard, "Ads in the Ether on PCS Phones, Pagers", Brandweek, Mar. 31, 1997, pp. 46-48.
"Emaginet Plans to 'Push' Its Way Into Consumer Mindset, Pocketbook", Interactive PR and Marketing News, May 30, 1997, Section: vol. 4, No. 22.
Simon, Ruth, "Make Sure Your Rebate Card Still Delivers The Goods", Money, Aug. 1997, Section: Your Money Monitor, p. 42.
Williams, Martyn, "Internet Updates", Newsbytes, Aug. 4, 1997.
Website: "MySimon Inc.—Simon's Search & Compare Shopping", (http // www mysimon com/), Copyright 1998.
Website: "Planet U, making promotional offers available to U", Copyright 1998.
"American Eagle Outfitters, Inc. Introduces the First Clear Credit Card", PR Newswire, Mar. 26, 1998, Section: Financial News.
Stewart, Sinclair, "To mail or not to mail?", Strategy, Oct. 12, 1998, Section: Strategy Directresponse Special Report, Couponing, p. D21.
"Microsoft and First USA Announce $90 Million Advertising Alliance for MSN", PR Newswire, Oct. 28, 1998, Section: Financial News.
Dennis, Sylvia, "Visa Gets Ready for Interactive Set-Top Boxes", Newsbytes, Dec. 14, 1998.
Shermach, Kelly, "Retailers Rebuild Roots As Loyalty Pioneers", Card Marketing, Jan. 1999, vol. 3, No. 1, (http // cardmarketing faulknergray com).
"FYI; Calls are free, after the ads", Star Tribune, Jan. 14, 1999, p. 1D.
Ellin, Abby, "Listening to an Earful for Savings", The New York Times, Jan. 24, 1999.
Files, Jennifer, "Grocers, AT&T team up; 'Smart coupon to offer bonus", Dallas Morning News, Feb. 6, 1999, Section: Business, p. 12F.
Wijnen, Renee, "Listening to Ads Earns Free Long Distance; Advertisers select target groups to hear messages", DM News, Mar. 1, 1999, Section: Supplement, Teleservices News, p. 1.
"Smart Cards: Buying Via Cable Lines", Future Banker, Mar. 1, 1999, Section: Future Money, p. 19.
"ATM Ads" CardTrak Online, Mar. 4, 1999, (wysiwyg //main 566/ http //www cardweb com/cardtrak/news/1999/march/4a html).
"Smart Card Quarterly", EFT Report, Mar. 24, 1999, Section: vol. 22, No. 6.
"$20 in free groceries when you switch to AT&T Residential Long Distance Service. Call 1 800 288-2662", Coupon dispensing machine at a Safeway grocery store, May 19, 1999.
Website: "e-centives FAQs", (http www emaginet com/de.../mamfaq shtml?esid=1BCE295AD7F430039A-192-168-100-10), download date: May 23, 1999.
Website: "Five great reasons to enroll", Coolsavings, download date: May 23, 1999.
Website: "MasterCard—The Smart Card: News & Views", download date: May 23, 1999.
Website: "Visa—Smart Cards—About Smart Cards", (http //www visa com/nt/chip/info html), download date: May 23, 1999.
Website: "Windows CE: SmartCard Background", (http //www. Microsoft com/windowsce/smartcard/start/background asp), download date: May 23, 1999.
Website: "Deja.com: [email] FREE $100 Aircheck plus $15,000 in Travel", (http x24 deja.../getdoc xp?...), download date: May 24, 1999.
"Royal Bank is First to Offer Instant Discount Program on No-Frills, Low Rate Option and Classic Visa Cards", Canada NewsWire, Jul. 2, 1999, Section: Financial News.
Higginbotham, Stacey, "Next, Online Bids Over Jail Time?", Business Week, Jul. 19, 1999, Section: Up Front.
Armstrong, Larry, "The Free-PC Game: Lure 'Em In and Lock 'Em Up", Business Week, Jul. 19, 1999, Section: Information Technology.
Poletti, Therese, "Latest Twist on Free PCs: Free iMacs", Fox News, Aug. 3, 1999, (www foxnews com).
Office Action for U.S. Appl. No. 09/219,267 mailed Mar. 6, 2006, 20 pp.
Office Action for U.S. Appl. No. 09/219,267 mailed Dec. 14, 2004, 28 pp.
Office Action for U.S. Appl. No. 09/219,267 mailed Jan. 9, 2004, 28 pp.
Office Action for U.S. Appl. No. 09/219,267 mailed Apr. 22, 2003, 19 pp.
Office Action for U.S. Appl. No. 09/219,267 mailed May 17, 2001, 22 pp.
Office Action for U.S. Appl. No. 09/579,215 mailed Jul. 12, 2007, 21 pp.
Office Action for U.S. Appl. No. 09/579,215 mailed Mar. 6, 2006, 20 pp.
Office Action for U.S. Appl. No. 09/579,215 mailed Dec. 17, 2004, 24 pp.
Office Action for U.S. Appl. No. 09/579,215 mailed Apr. 7, 2004, 32 pp.
Office Action for U.S. Appl. No. 09/579,215 mailed Jul. 29, 2003, 20 pp.
Office Action for U.S. Appl. No. 09/282,747 mailed Feb. 27, 2007, 25 pp.
Office Action for U.S. Appl. No. 09/282,747 mailed Mar. 21, 2006, 22 pp.
Office Action for U.S. Appl. No. 09/282,747 mailed Dec. 7, 2004, 25 pp.
Office Action for U.S. Appl. No. 09/282,747 mailed Apr. 13, 2004, 17 pp.
Office Action for U.S. Appl. No. 09/282,747 mailed Nov. 19, 2002, 18 pp.
Office Action for U.S. Appl. No. 09/282,747 mailed Mar. 1, 2002, 20 pp.
Office Action for U.S. Appl. No. 09/282,747 mailed May 21, 2001, 43 pp.
Office Action for U.S. Appl. No. 09/282,747 mailed Oct. 13, 2000, 34 pp.
Office Action for U.S. Appl. No. 09/322,351 mailed Nov. 30, 2006, 16 pp.
Office Action for U.S. Appl. No. 09/322,351 mailed Mar. 13, 2006, 20 pp.
Office Action for U.S. Appl. No. 09/322,351 mailed Nov. 19, 2004, 22 pp.
Office Action for U.S. Appl. No. 09/322,351 mailed Jan. 27, 2003, 28 pp.
Office Action for U.S. Appl. No. 09/322,351 mailed Sep. 25, 2001, 22 pp.
Office Action for U.S. Appl. No. 09/322,351 mailed Oct. 12, 2004, 34 pp.
Board of Appeals Decision for U.S. Appl. No. 09/540,034 decided May 16, 2007, 16 pp.
Examiner's Answer for U.S. Appl. No. 09/540,034 mailed Jan. 23, 2006, 42 pp.
Office Action for U.S. Appl. No. 09/540,034 mailed Oct. 10, 2003, 22 pp.
Office Action for U.S. Appl. No. 09/540,034 mailed Jan. 14, 2003, 21 pp.
Tedesco, Richard "Pactel pushed 'Net access." Broadcasting & Cable, Jun. 3, 1996, pp. 64-65.
Colman, Price "Cross-marketing cuts cable bills." Broadcasting & Cable, Jul. 15, 1996, p. 44.
Fleming et al. "European Banks, Insurance Firms Cross Into Each Other's Territory." Wall Street Journal. (Europe) Feb. 20, 1991, p. 9.
Website: "buy.com", (wysiwyg//29http//www buy com/retail/w.. Category=CELLULAR&Keyword=cellular+), copyright 1997-2003.
Website: "Verizon Wireless at Radio Shack", (http //www radioshack com/Partners/Verizon/VerizonLanding asp?ln=ve), Copyright 2003.
"Examiner's Affidavit", Affidavit Apr. 11, 2003.
Pagoda, Dianne M., "G.E.C.C. offers credit card with discounts, rebates; General Electric Corp." WWD (Women's Wear Daily), vol. 164; No. 46; p. 7, Sep. 3, 1992.
Kristof, Kathy "Card Sharks are in Season; Be Wary of Discounts and Rebates as you Shop Around for Good Credit Deals", Chicago Tribune, p. 9; Nov. 23, 1993.
Ellis, Stephen "Credit Card Firms Drive Down Costs", Sunday Times, Feb. 27, 1994.

Block, Valerie "GM Turns up the Heat with Plan to Cross-Sell Some Financial Products", The American Banker, p. 16, Nov. 18, 1994.
Wildstrom, Stephen H. "Pagers That Can Spell It All Out", Business Week, p. 16, Jan. 16, 1995.
Meece, Mickey "Big Finance Companies May Want Piece of Limited's Private-Label Card Program", The American Banker, p. 8, Apr. 12, 1995.
Schrage, Michael "Free Stuff! Predatory Pricing or Creative Cross-Promotion? You be the Judge; The Beta Version; Industry Trend or Event" Marketing Computers, vol. 15, No. 9. p. 24, Oct. 1995.
Marshall, Kyle "More Phone Choices Ring in", The News and Observer, p. D1, Aug. 13, 1996.
Wessel, Harry "Rewarding Experience?; Credit Cards Offering Bonuses not for Everyone" Chicago Tribune, p. 1, Nov. 4, 1996.
Selasky, Susan "Easy-To-Swallow Savings; Diner Credit Cards Serve Wide Menu of Discounts", Pittsburgh Post-Gazette, p. F-2, Dec. 5, 1996.
"Merger Creates Alliance Data" , Credit Risk Management Report, vol. 6 No. 25, Dec. 16, 1996.
Higgins, Stephen "Digital Phone Service on the Way", New Haven Register, Jan. 7, 1997.
Kerstetter, Jim "E-Commerce Updates Get Intelligent Agents; Electronic Commerce; Brief Article Product", PC Week No. 5, vol. 14;p. 6; Feb. 3, 1997.
Barlow, Rick Relationship Marketing: Coalation Marketing Is Coming Back; Brandweek, Apr. 28, 1997.
Gilligan, Gregory J. "Credit Cards From Retail Stores a Mixed Blessing for Shoppers", p. E-1, Jul. 20, 1997.
Simon, Ruth "Make Sure Your Rebate Card Still Delvers the Goods", Money, p. 42, Aug. 1997.
Fitzgerald, Beth "New Jersey-Based SCA Helps Private Label Credit Cards Take off" The Star Ledger, Aug. 4, 1997.
Sanders, Edmund "Tricky Business; The Magic of Rebate Cards Can Quickly Disappear" Chicago Tribune, p. 1, Aug. 18, 1997.
"SNET Cellular Value Plans", Nov. 1, 1997.
Wijnen, Renee "Cendant Eyes Cross-Marketing Opportunities; CUC International—HFS Inc. Merger Expected to Yield an Additional 2 Million Club Members" DM News, p. 4, Feb. 2, 1998.
"Cardholders Think Big", Bank Marketing International, p. 8, Mar. 1998.
Wald, Matthew "Spending it; Untying Cellular Phones From Those Annual Contracts", The New York Times, Sec. 3 p. 10 col. 2, Mar. 15, 1998.
"American Eagle Outfitters, Inc. Introduces the First Clear Credit Card", PR Newswire, Mar. 26, 1998.
Ling, The Hooi "Prices of Handphones Dive, Thanks to Cross-Subsidies", Business Times, p. 1, Apr. 8, 1998.
"Card Briefs: Beneficial, Casual Male Team Up on Card", The American Banker, p. 20, May 4, 1998.
"Points Earn Little Credit as Cardholders Fail to Cash in"0 Birmingham Post, p. 32, May 9, 1998.
"Jay Jacobs Inc. Introduces Private Label Card", Business Wire, May 18, 1998.
"Wellspark Group Launches V.I.P. Rewards; The Most Comprehensive Relationship Marketing Program Ever Created by a Mall Developer", Business Wire, May 19, 1998.
"Shoppers Charge Accounts Co. to Administer Private Label Credit Card for Lew Magram LTD.; Program Marks SCA's Entry Into Retail Catalog/Mail Order Industry", PR Newswire, Jun. 29, 1998.
Quittner, Joshua "Cell Phones At 7-11?; Almost Everyone is Selling Wireless Service These Days; Here's How to Get the Right Deal", Time, p. 95, Jul. 6, 1998.
Cruz, Humberto "The Savings Game", The Cinninnati Enquirer, p. B16, Aug. 31, 1998.
"Filene's" Credit Card Application, Sep. 1998.
"Club Macy's" Charge Account Application, Sep. 1998.
Kingson Bloom, Jennifer "Wal-Mart on Retail Road Less Traveled: Cobranding", The American Banker, Sep. 11, 1998.
Elkin, Tobi "Promotions: MasterCard Wins Coveted On-Pack Real Estate in Tie-in with Microsoft", Brandweek, Sep. 14, 1998.
"To Business and Technology Editors" PR Newswire, Oct. 28, 1998.
Fitzgerald, Kate "Dual-Function Cards Latest Pitch to Call in Holders"" Card Marketing (http://cardmarketing.faulkernergray.com), Nov. 1998.
Griffin, Kate "Issuers Charge Ahead to Focus on Price vs Brand", Card Marketing (http://cardmarketing.faulkernergray.com), Nov. 1998.
"Retail Cards: Attention Kmart Card Holders: 6% Back is Dead a New Package of Perks is Coming", Credit Card News, Nov. 1, 1998.
"Compettion: First USA, Withy Its Microsoft Pact, Is King of the Internet", Credit Card News, Nov. 1, 1998.
Cowell, Alan "America's Turn to Colonize; Creditcard Issuers Invade Britain, With U.S. Firepower", The New York Times, Section C; p. 1 col. 2, Nov. 12, 1998.
"#1 Online Department Store Joins Clickrewards in Time for the Holidays; AZAZZ.COM to Supply Name-Brand Merchandise for Netcentives' Clickrewards Catalog and Clickrewards; Members Can Now Earn Generous Clickmiles Promotions Withing the AZAZZ.COM Internet Department Store", PR Newswire, Nov. 27, 1998.
Shermach, Kelly "Partnerships Help Issuers Weave Web Concepts", Card Marketing (http://cardmarketing.faulkernergray.com), Download date Nov. 1998.
"Largest Internet as Deal Signed", Bank Marketing International Dec. 1998.
"AMAZON.COM and NETFLIX.COM Establish Promotional Relationship for the Sale and Rental of DVD Titles", Business Wire, Dec. 4, 1998.
"At Sports Superstore Online, Shoppers Get More for Their Money; 10, 1000 Reasons to Shop at Sports Superstore Online", Business Wire, Dec. 4, 1998.
Korry, Elaine "Credit Card Enticements", NPR Morning Edition Transcript #98122308-210, Dec. 23, 1998.
Holton, Lisa "Cable Efforts Help Issuers Tune Into New Markets", Card Marketing, (http://cardmarketing.faulkernergray.com), download date Jan. 1999.
"Northwest Airlines. Sprint Enter Into Mileage Partnership; Consumers Can Earn Up to 16,500 Frequent Flyer Miles Through Wide Range of Communications Services—Long Distance, Internet, Paging and Ultimately Sprint PCS", PR Newswire Jan. 5, 1999.
"Free From Nextcard-The Ages of Myst", (http//www.nextcard.com/ages/agesofmyst.htm), download date Jan. 6, 1999.
Kreinin Souccar, Miriam "Epidemic of Rate Shopping Spurs a Search for Remedies", The American Banker, Jan. 7, 1999.
"Introducing E.Card Visa", (http://app 1.firstusa.com/pcards/ecard/index1.cfm?mkid-6j08&promo=1ec0lec10), Jan. 11, 1999.
"About Smartsave", (http://www.savesmart.com/about/savesmart.html), download date Jan. 12, 1999.
"THE TRIP.COM, Visa Launch Reward Program", (http://www.internetnews.com/ec-news/1999/01/1302-trip.html), download date Jan. 13, 1999.
"About Clickrewards the Best Way to Earn Miles", (http://www.clickrewards.com/about.html), download date Jan. 13, 1999.
"My Simon; World's Most Intelligent Shopping Agent", (http://www.mysimon.com), download date Jan. 13, 1999.
"Join AOL Long Distance and this is What You Will Receive", America Online: Johnny Axxe, download date Jan. 13, 1999.
"The New AE Card", (http://www.aeotfitters.com/crd.htm), download date Jan. 14, 1999.
"Endeavour Travel; TS60 Eight Day New Zealand Fly Drive Package", (http://www.anzac.com/endvr/ts60.html), download date Jan. 17, 1999.
"Altavista Signup; Altavista's Special Offer to You", (http://altavista.iname.com/promoxtra_alta.html), download date Jan. 17, 1999.
"Rent From Netflix.combuy From AMAZON.COM", (http://www.netflix.com/teaming_with_amazonasp?si) download date Jan. 17, 1999.
"Sprint Sense Day and Your Titanic Videocassette", (http://csg.sprint.com/titanic) download date Jan. 18, 1999.
O'Brien, Timothy "The Markets: Market Place—Taking the Dangerout of Risk; Chase Says Models Helped it Avoid Financial Minefields", The New York Times, Sec. C; p. 1. col 2, Jan. 20, 1999.
"Visa, Travelweb Enter Online Marketing Partnership", (http://www.internetnews.com/ec-news/1999) download date Jan. 25, 1999.

"Kiosk Issue Cards for Loyalty and Credit" RT News, (www.retailtech.com), Feb. 1999.

Feldman, Amy "Paying With Plastic Not Such Smart Idea", New York Daily News Online (http://www.nydailynew) download date Mar. 22, 1999.

"Milestone Events Makint Spring History 1899-1989", undated. 1 pg.

Sims, Calvin, "Centel Acquiring Cellular Phone Unit", The New York Times, May 28, 1988, Section 1, 2 pp.

Butcher, Lola, "United May Pocket Windfall With Sale of Cellular Business", Kansas City Business Journal, Jun. 6, 1988, 3 pp.

Winter, Christine, "GTE to Sell Par of US Sprint Stake Deal to Shift Another 30% to Partner Untied Telecom", Chicago Tribune, Jul. 19, 1988, 2 pp.

"United Telecommunications Announces Completion of Sale", PR Newswire, Oct. 5, 1988, 2 pp.

Henze, Doug, "A Tightening in Cellular Market", Oakland Business Monthly, Aug. 1989, 6 pp.

"United Telecom halts Sprint deal as net falls", Chicago Tribune, Jul. 18, 1990, 3 pp.

Connely, Joanne, "FCC gets spectrum comments; US Federal Communications Commission investigates development of personal communications networks and radio-based technologies", Chilton's Electronic News, Jan. 28, 1991, 3 pp.

Manuta, Lou, "Should cellular be deregulated? Cellular radio telephones; Industry Overview", Cellular Marketing, Jan. 1992, 6 pp.

Rossa, James L., "Cellphones ride roller coaster; American Information Technologies Corp. to cut commission rebates to retailers", HFD-The Weekly Home Furnishings Newspaper, Feb. 3, 1992.

La Rossa, James Jr., "Ameritech policy stirs debate; executives weigh retailer rebates on eve of Cellular Telecommunications Industry Association Show; American Information Technologies Corp; Special CTIA Show Issue", HFD-The Weekly Home Furnishings Newspaper, Feb. 10, 1992, 3 pp.

Ziegler, Bart, "Sprint to Merge with Centel", Associated Press, May 28, 1992, 3 pp.

Marek, Sue, "The carrier/retailer love affair—still going? Cellular radio industry; Cover Story", Cellular Marketing, Jul. 1992, 5 pp.

"Resale Effect Debate; GAO Faults FCC on Cellular Duopoly Scheme", Communications Daily, Jul. 2, 1992, 2 pp.

Strandjord, Jeannine M., "Should you bundle 401k services? Employee Benefits", Financial Executive, Sep. 1992, 6 pp.

Brown, Bob and Wallace, Bob, "AT&T bid fro McCaw to reshape landscape; Gives dominant carrier access to rapidly evolving market and opportunity to influence, drive, change.", NetworkWorld, Nov. 9, 1992, Section: Top News, 3 pp.

Avril, Tom, "Centel Confident of Victory After Vote on Sprint Merger", Dec. 2, 1992, 3 pp.

Avril, Tom, "Communications; Centel Investors Vote on Sprint Merger", The Commercial Appeal, Dec. 3, 1992, 2 pp.

Oloroso Jr., Arsenio, "Centel holds its breath; Shareholders wait to see outcome of Sprint deal", 2 pp.

Yates, Ronald E., "Sprint-Centel merger complete despite fears", Chicago Tribune, Mar. 10, 1993, 8 pp.

Wenske, Paul, "Sprint's big deal", Ingram's May 1993, Section: vol. 19, No. 5, 8 pp.

"Petition Criticized; Fight on CPE Unbundling for IXC Resellers Launched by Major Retailers", Communications Daily, Aug. 10, 1993, Section: vol. 13, No. 153, 2 pp.

DeFebo, Carl, Jr., "Sprint opens first superstore in Mechanicsburg", Central Penn Business Journal, Nov. 3, 1993, 3 pp.

Testimony Feb. 8, 1994, John V. Roach Consumer Electronics Retailers Coalition House Energy/Telecommunications and Finance Antitrust Reform Act of 1993, Federal Document Clearing House Congressional Testimony, Feb. 8, 1994, 8 pp.

"Form 10-K Sprint Corp—FON", Filed Mar. 15, 1994 (Dec. 31, 1993) 8 pp.

Kraemer, Joseph S., "Local competition; Changing Ground Rules for Network Access", Business Communications Review, Sep. 1994, 10 pp.

Steward, Shawn, "Activating the masses", Cellular Business, Oct. 1994, Section: vol. 11, No. 10, 6 pp.

"Sprint—Defining the Communications Company of the Future 1994 Annual Report to Shareholders", Document Date: Dec. 31, 1994, 32 pp.

"Inside Sprint Corporation: 1994 Competitive Market Developments", Inside Telecom, Jul. 17, 1995, 7 pp.

"Tandy Corp—Form-Type ARS", Document Date: Dec. 31, 1995, Filing Date: Apr. 10, 1996, 1 pg.

"Sprint Completes Spin-Off of It's Cellular Subsidiary", Chicago Sun-Times, Mar. 8, 1996, Section: Financial, 2 pp.

"Securities and Exchange Commission Form 10-K/A, 360 Degrees Communications Co Cross-Reference: Sprint Cellular Co", For the fiscal year ended Dec. 31, 1995, Filing date: Apr. 16, 1996. 23 pp.

Press Release: "Sprint, Sprint Spectrum and Radio Shack Join Forces", New York, NY Sep. 11, 1996, 2 pp.

Maxon, Terry, "Tandy pairs with Sprint for venture; Companies will offer expanded offering of telecommunications products, services", The Dallas Morning News, Sep. 12, 1996, 3 pp.

Hopper, Kathryn, "Tandy, Sprint to offer one-stop phone shopping", Fort Worth Star-Telegram, Sep. 12, 1996, Section: News, 4 pp.

"Tandy Corporation—Quarterly Report", For the quarterly period ended Sep. 30, 1996, Filed Nov. 12, 1996, 36 pp.

Alleman, James and Cole, Larry, "The International Handbook of Telecommunications Economics, vol. III, Sprint—GTE's lost opportunity", 13 pp.

King, Suzanne and Hayes, David, "Sprint PCS has played key role in cell phone boom", Posted: Jan. 6, 2002, 10 pp.

Website: "Sprint 1995 Annual Report—Notes to Consolidated Financial Statements", (http //www sprint com/sprint/annual/95/finance/p_52a html), download date Oct. 21, 2003, 1 pg.

Website: "Sprint/History", (http www sprint com/sprint/ir/sd/timeline_02 html), 1990-1995, download date: Oct. 22, 2003. 2 pp.

Website: "Surviving the Great Depression", (http //www geocities com/Athens/Column/4735/clbrown2 html), download date: Nov. 13, 2003, 2 pp.

Website: "The Mobile: 20 Years Young", (http: //motoinfo Motorola com/motoinfo/20$^{th}$_anniversary/docs/timeline pdf), download date: Jan. 9, 2004, 2 pp.

Website: "Qualcomm About Qualcomm—History / Key Milestones", (http www qualcomm com/about/history/ html), download date: Jul. 27, 2004, 4 pp.

Press Release: "Fort Worth Outlet Square Offers American Airlines Advantage Miles", Released Aug. 21, 1996, 2 pp.

Taylor, Paul, "Towards a dream market", Financial Times, Sep. 4, 1996, Section: Survey—FTIT, 2 pp.

Donlon, Brian, USA Today, "Cable Industry channels its effort in April," Mar. 29, 1990, 2 pp.

Blattberg, Robert C and Levin, Alan, "Modeling The Effectiveness and Profitability of Trade Promotions", Marketing Science, 1987, 23 pp.

Anonymous, Discount Store News, Manufacturers shine with cross promotional prowess, Aug. 5, 1996, 2 pp.

Nimmer, Raymond T., "Commercial Transactions on the Global Information Infrastructure: Electronic Contracting: Legal Issues", The John Marshall Journal of Computer Information Law, 14 J. Marshall J. Computer & Info. L. 211, Winter 1996, 26 pp.

Bonnici, Joseph et al., "Consumer issues in coupon usage: An exploratory analysis", Journal of Applied Business Research, winter 1996/1997, 11 pp.

"Dispensing the future", Electronic Payments International, May 1997, Section: Feature; 5 pp.

"Products and Services, Checkout Direct", Catalina Marketing Corporation, (http //catalinamktg com/prodcdir htm), download date: May 29, 1997, 14 pp.

"Industry Briefs", Card News, Jun. 9, 1997, Section: vol. 12, No. 11, 2 pp.

Schanhausser, Mark, "A maze of plastic consumers try to make their way throught the confusing state of credit cards", St. Louis Post Dispatch, Jul. 30, 1994, 2 pp.

Edwards, John G. "Credit card issuers see some growth", Las Vegas Review—Journal. Mar. 18, 1994, 2 pp.

Reilly, Brian, "Upselling strategies hit the net", Net Marketing, Dec. 1996, 4 pp.

"Heads I win, tails you lose", The Economist, Jun. 13, 1992, 2 pp.

Yoshihara, Nancy "New Magazines Try to Reach Asian Businesses The Fledgling English-Language Publication seek Readers on both sides of the Pacific", Los Angeles Times, Oct. 2, 1989, 3 pp.

Samuelson, Paul, Economics Ninth Edition, Copyright 1973, 10 pp.

Spoor, Dana L., "Selling a free phone", Cellular Business, Feb. 1994, vol. No. 2, 5 pp.

Crump, Stuart F. Jr., "Faith goes cellular (case study of a real estate agent's selection of a cellular phone and carrier)", Home Office Computing, Jun. 1994, 4 pp.

Mr. Pigeon, "Cell Phone Hype Pigeon Family Sweats the Details", Star Tribune, Jan. 29, 1995, Edition: Metro Edition, Section: Marketplace, 5 pp.

Parker, Penny, "Cart vendors offer line-free shopping", Denver Post, Dec. 20, 1995, pp.

Lacher, Lisa, "Coupon Gimmick Registers Profits", Business Record, Dec. 7, 1987, 2 pp.

Stevens, Lawrence, "Hypermarket challenge", Computerworld, Dec. 10, 1988, 2 pp.

Blattberg, Robert C., "Interactive marketing; exploiting the age of addressability", Sloan Management Review, Sep. 22, 1991, 15 pp.

McDowell, Bill, "Frequency marketing builds repeat business" Building Supply Home Centers, Aug. 1993, 5 pp.

Kristof, Kathy, "Card Sharks Are in Season; Be Wary of Discounts and Rebates as You Shop Around for Good Credit", Chicago Tribune, Nov. 23, 1993, 2 pp.

Smith, Alison, "Survey of UK Consumer Credit and Asset Finance", Financial Times, Nov. 3, 1994, 3 pp.

Linnen, Herb et al. "AT&T comments on new FCC rules to curb 'slamming", Jun. 14, 1995, 4 pp.

Andreoli, Tom et al., "Cash Machines Offer A Whole Lotto Money . . . ", Crain's Chicago Business, Jun. 19, 1995, Section: News, 2 pp.

McKinney, Jeff, "Merchant program could pay off for provident", The Cincinnati Enquirer, Mar. 24, 1996, 2 pp.

"Switch your Chase MasterCard to a Shell MasterCard from Chase and you'll earn: Free Formula Shell Gasoline", Chase Manhattan Bank USA, N.A., Sep. 1997, 2 pp.

Hoeschen, Brad, "Brookfield Square hopes mall card strikes a chord", Business Journal-Milwaukee, Sep. 12, 1997, Section: vol. 14, No. 50, 2 pp.

Kraus, Jeffrey, "Subsidized TV sets?", CED (Communications Engineering & Design), Feb. 1998, 3 pp.

Goldblatt, Henry, "AT&T Finally Has An Operator . . . ", Fortune, Feb. 16, 1998, 4 pp.

"New Partners, more exciting rewards: The Membership Rewards program for 1998", (http //www americanexpress com/rewards/news/docs/1998new_mr shtml), download date: Mar. 12, 1998, 38 pp.

"New Partners, more exciting rewards: The Membership Rewards program for 1998", (http //www americanexpress com/rewards/news/docs/1998new_mr shtml), download date: Mar. 12, 1998, 38 pp.

Elstrom, Peter, "Reach Out and Play Someone", Business Week, Mar. 23, 1998, 1 pg.

Website: "MCI Freeflix Free Video Rental Program", (http //www mci com/aboutus/products/prepaid/promotional shtm), download date: Apr. 21, 1998, 1 pg.

Website: "Wall Street Access . . . : Active Trader Rebate Program", (http //www wsaccess com/active_rebate_program htm), download date: Apr. 22, 1998, 2 pp.

Amato-McCoy, Deena, "Co-Branded Acme Credit Card Rewards Loyal Users" Supermarket News, Jun. 15, 1998, Section: 1 pg.

Website: "DealDeal com- The Best Auction Deals on the . . . ; Bid To Win", (http www dealdeal com/pxfm/bidandwin cfm?classID=elc &cid=&cal=). download date: Oct. 29, 1998, 2 pp.

Ross, Chuck et al., "Coke Card promotion set for '98", (http //web archive org/web/19980116055228/http //adage com/news_and_features/feature...), download date: Nov. 14, 2003, 2 pp.

Ellis, Stephen, "Credit card firms drive down costs", Feb. 27, 1994, 4 pp.

Schrage, Michael, "An experiment in economic theory", Nov. 26, 1989, 3 pp.

Marshall, Kyle, "More phone choices ring in", Aug. 13, 1996, 2 pp.

Selasky, Susan, Easy to Swallow Savings; Diner Credit Cards Serve Wide Menu of Discount, Pittsburgh Post-Gazette, Dec. 5, 1996, 3 pp.

SNET Cellular Value Plans, 1997, 3 pp.

Higgins, Stephen, "Digital phone service on the way", New Haven Register, Jan. 7, 1997, 3 pp.

Barlow, Rick, Relationship Marketing: Coalition Marketing is Coming Back, Brandweek, Apr. 28, 1997, 2 pp.

Fitzgerald, Beth, "New Jersey-Based SCA Helps Private Label Credit Cards Take Off", The Star-Ledger, Aug. 4, 1997, 3 pp.

Sanders, Edmund, "The Magic of Rebate Cards Can Quickly Disappear", Chicago Tribune, Aug. 18, 1997, 3 pp.

Wijnen, Renee, "Cendant Eyes Cross-Marketing Opportunities"DM News, Feb. 2, 1998, 2 pp.

Wald, Matthew L., "Untying Cellular Phones From Those Annual Contracts", New York Times, Mar. 15, 1998, 2 pp.

Ling, Teh Hooi, "Prices of handphones dive, thanks to cross-subsidies", Business Times, Apr. 8, 1998, 2 pp.

"Points earn Little Credit as Cardholders Fail to cash in", Birmingham Post, May 9, 1998, 2 pp.

"Jay Jacobs, Inc. Introduces Private Label Credit card," Business Wire, May 18, 1998, 2 pp.

Quittner, Joshua, "Cell Phones at 7-11?", Jul. 6, 1998, 2 pp.

Cruz, Humberto, "The Savings Game", The Cincinnati Enquirer, Aug. 31, 1998, 3 pp.

Photocopy of Club Macy's Application 1998, 2 pp.

Largest Internet ad deal signed, Bank Marketing International, Dec. 1998, 3 pp.

Amazon.com & Netflix.com Establish Promotional Relationship for the Sale and Rental of DVD Titles, Dec. 4, 1998, 3 pp.

"At Sports Superstore online Shoppers get more for their money", Business Wire, Dec. 4, 1998, 2 pp.

"Free from NextCard-Age of the Myst", Jan. 6, 1999, 2 pp.

Soucar, Miriam Kreinin, Epidemic of Rate Shopping Spurs a Search for Remedies, Jan. 7, 1999, 3 pp.

Introducing e.card VISA, E.Card Web Page, Jan. 11, 1999, 5 pp.

About Save Smart, Jan. 12, 1999, 4 pp.

Alta Vista's special offer to you.$10 for any CD, Jan. 17, 1999, 1 pg.

Wells Fargo ATMs in California Become Little Billboards, The Associated Press, Mar. 29, 1999, 1 pg.

Cellular wrong signals, Newsday, Jul. 2, 1993, 1 pg.

Foster, Ed, "Can mixing cookies with online marketing be a recipe for heartburn?" Jul. 22, 1996, 2 pp.

Brochure: "Reaching Out in New Directions" 1996, 18 pp.

"Sprint—Company Data", Securities and Exchange Commission Form 10-Q, for the quarterly period ended Mar. 31, 1994, 4 pp.

Jenson, Elizabeth, "Yakking it Up", The Wall Street Journal Europe, Apr. 28, 1998, 5 pp.

Point.com:webpage copyright 1998-2000, 5 pp.

Travel Agent. "No-Show Crackdown", Aug. 18, 1997, 4 pp.

SNET Digital Value Plans, Jun. 12, 1998, 1 pg.

Radio shack introduces Handheld Flip-Style Cellular Telephone With Vibration Alert, Oct. 16, 1996, 2 pp.

Wildstrom, Stephen H., "Pagers that can speel it out", Business Week, Jan. 16, 1995, 2 pp.

PCT International Search Report for Application No. PCT/US99/19955, Feb. 23, 2000, 5 pp.

Competitive long distance company GST Telecom has filed suit in U.S. District County, Tucson May 15, 1996, 3 pp.

"Shamrock Technology Co. establishes No. American HQ as monitor . . . ", Business Wire, Mar. 25, 1997, 2 pp.

AT & T Wireless adds convenience to buying cellular service, Nov. 20, 1996, 2 pp.

"Ads in the ether on PCS phones, pagers" Brandweek, Mar. 31, 1997, 3 pp.

Office Action for U.S. Appl. No. 09/219,267 mailed Jun. 13, 2008, 12 pp.

Office Action for U.S. Appl. No. 09/219,267 mailed Sep. 7, 2007, 17 pp.

Office Action for U.S. Appl. No. 09/579,215 mailed Mar. 20, 2008, 4 pp.

Office Action for U.S. Appl. No. 09/282,747 mailed Jun. 12, 2008, 14 pp.

Office Action for U.S. Appl. No. 09/282,747 mailed Sep. 7, 2007, 23 pp.

Office Action for U.S. Appl. No. 09/322,351 mailed Apr. 17, 2008, 18 pp.

Office Action for U.S. Appl. No. 09/322,351 mailed Aug. 20, 2007, 25 pp.

Office Action for U.S. Appl. No. 11/423,481 mailed Jun. 2, 2008, 17 pp.

Office Action for U.S. Appl. No. 11/423,481 mailed Oct. 9, 2007, 24 pp.

Office Action for U.S. Appl. No. 11/423,481 mailed Jan. 25, 2007, 6 pp.

Office Action for U.S. Appl. No. 11/423,493 mailed Oct. 18, 2007, 21 pp.

Office Action for U.S. Appl. No. 11/423,493 mailed Jan. 26, 2007, 6 pp.

Office Action for U.S. Appl. No. 11/423,498 mailed Oct. 18, 2007, 9 pp.

Office Action for U.S. Appl. No. 11/423,498 mailed Jan. 26, 2007, 6 pp.

Marn & Rosiello, "Managing price, gaining profit", McKinsey Quarterly, Autumn, 1992, 10 pp.

Affidavit of Michael D. Downs with Exhibits, dated Apr. 6, 2007, 19 pp.

Affidavit of Michael D. Downs with Exhibits, dated Apr. 6, 2007, 91 pp.

Decision on Appeal, U.S. Appl. No. 09/540,034, decided Mar. 26, 2007, 16 pp.

International Search Report for PCT/US00/18474, mailed Jun. 18, 2001, 4 pp.

International Search Report for PCT/US99/13409, mailed Jun. 14, 1999, 6 pp.

International Search Report for PCT/US99/13819, mailed Jun. 18, 1999, 7 pp.

Office Action for U.S. Appl. No. 09/219,267, mailed Mar. 10, 2009, 15 pp.

Office Action for U.S. Appl. No. 11/423,481, mailed Mar. 5, 2009, 18 pp.

Office Action for U.S. Appl. No. 09/282,747, mailed Mar. 4, 2009, 16 pp.

Oslund, John, "The Battle is Joined", Startribune.com, Feb. 12, 1996, 6 pp.

Lisa Fichenscher, "Merchant: American Express Seeks to Mine Its Data on Cardholder Spending Patterns", The American Banker, Section: Credit/Debit/ATMS; p. 20; Mar. 24, 1997.

Lisa Fichenscher, "Amex to Start Free Rewards Program with Discounts on Merchandise", The American Banker, Section: Credit/Debit/ATMS; p. 10; Oct. 18, 1996.

Kate Fitzgerald, "Amex Program Moves Loyalty To Next Level: Custom extras finds a medium customers can't ignore: Billing Statements", Crain Communications Inc., Advertising Age, Section; News; p. 2; Nov. 4, 1996.

PCT International Search Report for Application No. PCT/US99/13819, mailing date Oct. 21, 1999.

\* cited by examiner

|     | CUSTOMER IDENTIFIER 420 | NAME 422 | BILLING ADDRESS 424 | CREDIT CARD INFORMATION 426 | E-MAIL 428 |
|-----|---|---|---|---|---|
| 402 → | C0001 | DAN MANN | 123 MAIN ST. | VISA 1111-1111-1111-1111 | DMANN@ISP.COM |
| 404 → | C0002 | STEVE DAVIS | 3 RIVERPLACE ROAD | AMEX 4444-5555-6666-3333 | SDAVIS@SCHOOL.EDU |
| 406 → | C0003 | JEFF SMITH | 2 THRUSH LANE | DIS 2222-3333-4444-7777 | SMITH@WEBTV.COM |
| 408 → | C0004 | GEORGE ALAN | 15 LAUREL AVENUE | VISA 1111-4444-8888-3333 | ALAN@WORK.COM |

FIG. 4

| | VENDOR IDENTIFIER 520 | VENDOR NAME 522 | VENDOR E-MAIL ADDRESS 524 | AMOUNT OWED TO VENDOR 526 |
|---|---|---|---|---|
| 502 | | | | |
| 504 → | V001 | VENDOR X | X@X.COM | $0.00 |
| 506 → | V002 | VENDOR Y | Y@Y.COM | $100.00 |
| 508 → | V003 | VENDOR Z | Z@Z.COM | $987.13 |
| → | V004 | VENDOR Q | Q@Q.COM | $45.00 |

FIG. 5

| | SUBSIDIZING VENDOR IDENTIFIER 720 | SUBSIDIZING VENDOR NAME 722 | ACCOUNT 724 | AMOUNT OWED BY SUBSIDIZING VENDOR 726 | RANK 728 |
|---|---|---|---|---|---|
| 704 | S001 | CREDIT CARD COMPANY X | BANK ACCOUNT #2345678 | $855.00 | 1 |
| 706 | S002 | LONG DISTANCE TELEPHONE Y | MC 1111-2222-3333-4444 | $4,390.00 | 2 |
| | S003 | SATELLITE TELEVISION Z | PREPAID BALANCE $10,500 | $0 | 3 |

FIG. 7

| | OFFER RULE IDENTIFIER 820 | SUBSIDIZING VENDOR IDENTIFIER 822 | SUBSIDY AMOUNT 824 | WHEN EFFECTIVE 826 | ADDITIONAL TRANSACTION REQUIRED 828 |
|---|---|---|---|---|---|
| 802 → | R0001 | S11 | UP TO $50 | ALWAYS | SIGN UP FOR CREDIT CARD ACCOUNT |
| 804 → | R0002 | S12 | UP TO $50 | PURCHASING ITEM P004 | SIGN UP FOR CREDIT CARD ACCOUNT |
| 806 → | R0003 | S12 | $40 | CREDIT CARD = VISA AND TOTAL PRICE > $100 | SIGN UP FOR VISA PLUS ACCOUNT |
| 808 → | R0004 | 213 | $80 | CUSTOMER IS FROM A NEW ENGLAND STATE | SIGN UP FOR CELLULAR TELEPHONE SERVICE |
| 810 → | R0005 | S14 | $75 | CUSTOMER DOES NOT HAVE CABLE TELEVISION FROM SERVICE PROVIDER | SIGN UP FOR CABLE TELEVISION |

| OFFER IDENTIFIER 920 | TRANSACTION IDENTIFIER 922 | SUBSIDIZING VENDOR IDENTIFIER 924 | OFFER RULE APPLIED 926 | SUBSIDY AMOUNT 928 | TOTAL PRICE 930 | TOTAL PRICE WITH SUBSIDY 932 | ACCEPTED 934 |
|---|---|---|---|---|---|---|---|
| F001 | T123 | S111 | R1230 | $50 | $97.12 | $37.12 | YES |
| F002 | T456 | S222 | R4561 | $100 | $19.95 | $19.95 | YES |
| F003 | T789 | S345 | R7892 | $10 | $10.00 | $0 | YES |
| F004 | T109 | S678 | R0123 | $15 | $15.00 | $0 | YES |
| F005 | T555 | S901 | R3454 | $75 | $48.00 | $0 | YES |

| SUBSIDIZING VENDOR IDENTIFIER: S888 | | | 1002 |
|---|---|---|---|
| TOTAL NUMBER OF OFFERS: 1,794 | | | 1004 |
| TOTAL NUMBER OF OFFERS ACCEPTED: 1,003 | | | 1006 |
| TOTAL AMOUNT OF SUBSIDIES: $52,800.00 | | | 1008 |
| OFFER RULE IDENTIFIER 1020 | NUMBER OF OFFERS 1022 | NUMBER OF OFFERS ACCEPTED 1024 | AMOUNT OF SUBSIDIES DUE 1026 |
| R1111 | 1004 | 500 | $2,500.00 |
| R2222 | 790 | 503 | $50,300.00 |

| ITEM IDENTIFIER 1120 | ITEM DESCRIPTION 1122 | ITEM PRICE 1124 | AVAILABILITY 1126 |
|---|---|---|---|
| P001 | WAR AND PEACE | $13.95 | IN STOCK |
| P002 | SUN TZU: THE ART OF WAR | $15.95 | AVAILABLE IN 2-3 DAYS |

FIG. 11

| | | |
|---|---|---|
| 2102 → | CUSTOMER IDENTIFIER | C0002 |
| 2104 → | CREDIT CARD INFORMATION | AMEX 4444-5555-6666-3333 |
| 2106 → | NUMBER OF CREDITS REMAINING | 3 |
| 2108 → | FREQUENCY | ONCE PER MONTH |
| 2110 → | NEXT CREDIT DATE | 3/18/2002 |
| 2112 → | AMOUNT OF CREDIT | $10.00 |

METHOD AND APPARATUS FOR PROVIDING CROSS-BENEFITS VIA A CENTRAL AUTHORITY

The present application is a continuation-in-part of copending U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION" to Jay S. Walker and Daniel E. Tedesco filed on Dec. 23, 1998, which is a continuation-in-part of U.S. patent application Ser. No. 08/943,483 entitled "SYSTEM AND METHOD FOR FACILITATING ACCEPTANCE OF CONDITIONAL PURCHASE OFFERS (CPOs)" to Andrew S. Van Luchene, Daniel E. Tedesco, James A. Jorasch, Jay S. Walker and Thomas M. Sparico filed on Oct. 3, 1997, now abandoned, which is a continuation-in-part of U.S. patent application Ser. No. 08/923,683 entitled "CONDITIONAL PURCHASE OFFER (CPO) MANAGEMENT SYSTEM FOR PACKAGES" to Andrew S. Van Luchene, Daniel E. Tedesco, James A. Jorasch, Jay S. Walker and T. Scott Case filed Sep. 4, 1997 and issued as U.S. Pat. No. 6,553,346 on Apr. 22, 2002, which is a continuation-in-part of U.S. patent application Ser. No. 08/889,319 entitled "CONDITIONAL PURCHASE OFFER MANAGEMENT SYSTEM" to Bruce Schneier, James A. Jorasch, Jay S. Walker and T. Scott Case filed Jul. 8, 1997, now U.S. Pat. No. 6,085,169 which is a continuation-in-part of U.S. application Ser. No. 08/707,660 filed Sep. 4, 1996 U.S. Pat. No. 5,794,207 entitled "METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS" issued to Bruce Schneier, James A. Jorasch and Jay S. Walker on Aug. 11, 1998; and a continuation-in-part of U.S. patent application Ser. No. 09/100,684 entitled "BILLING STATEMENT CUSTOMER ACQUISITION SYSTEM" to Daniel E. Tedesco, James A. Jorasch and Jay S. Walker filed on Jun. 19, 1998 and issued as U.S. Pat. No. 6,898,570 on May 24, 2005, which is a continuation-in-part of U.S. patent application Ser. No. 08/982,149 entitled "METHOD AND APPARATUS FOR PRINTING A BILLING STATEMENT TO PROVIDE SUPPLEMENTARY PRODUCT SALES" to Jay S. Walker, Daniel E. Tedesco, Andrew S. Van Luchene and Dean P. Alderucci filed on Dec. 1, 1997 and issued on Mar. 6, 2001 as U.S. Pat. No. 6,196,458 B1; and a continuation-in-part of U.S. patent application Ser. No. 08/994,426 entitled: METHOD AND APPARATUS FOR PROVIDING SUPPLEMENTARY PRODUCT SALES TO A CUSTOMER AT A CUSTOMER TERMINAL" to Jay S. Walker, Andrew S. Van Luchene and Daniel E. Tedesco filed on Dec. 19, 1997 and issued as U.S. Pat. No. 6,694,300 on Feb. 17, 2004, which is a continuation-in-part of U.S. patent application Ser. No. 08/920,116 entitled "METHOD AND SYSTEM FOR PROCESSING SUPPLEMENTARY PRODUCT SALES AT A POINT-OF-SALE TERMINAL" to Jay S. Walker, James A. Jorasch and Andrew S. Van Luchene filed on Aug. 26, 1997 and issued on Sep. 12, 2000 as U.S. Pat. No. 6,119,099; which is a continuation-in-part of U.S. patent application Ser. No. 08/822,709 entitled "SYSTEM AND METHOD FOR PERFORMING LOTTERY TICKET TRANSACTIONS UTILIZING POINT-OF-SALE TERMINALS" to Jay S. Walker, James A. Jorasch and Sanjay K. Jindal filed on Mar. 21, 1997 and issued on Jul. 31, 2001 as U.S. Pat. No. 6,267,670 B1; each of the foregoing applications incorporated herein by reference.

FIELD OF THE INVENTION

The present invention relates to methods and apparatus for facilitating commerce.

BACKGROUND OF THE INVENTION

There is a great deal of competition among vendors to attract and retain customers. Even when a customer has browsed a vendor's inventory, he will not make a purchase if an item's price is greater than the amount the customer is willing to pay. One way to increase customer willingness to purchase is to provide discounts on items purchased. Unfortunately, vendors must use discounts sparingly, since reducing purchase prices likewise reduces margins and the reduced margins may not be offset by increased sales volume.

A vendor may also offer promotions to provide an incentive for customers to make purchases. For example, a vendor may offer a "buy one get one free" promotion whereby a purchase of an item yields the benefit of an additional item at no cost. Similarly, a vendor may provide a discount on a purchase in exchange for signing up for a credit card account provided by the vendor.

Promotions may also be provided among two or more vendors. For example, a first vendor may advertise that if a particular product is purchased, another product may be purchased from or given away by a second vendor.

The parent application of the present application, U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION", filed on Dec. 23, 1998, discloses a method and apparatus that permits a customer that is purchasing items from a first vendor to receive a benefit (e.g. a credit for the price of the items) from a second vendor. The present application provides further embodiments of this novel and beneficial invention.

SUMMARY OF THE INVENTION

It is an object of the present invention to provide a method and apparatus for facilitating commerce.

In accordance with the present invention, a controller is in communication with a plurality of vendors that are servicing customers, as well as with a plurality of "subsidizing" vendors seeking access to those customers. The controller receives from a first vendor server an indication of one or more items that a customer is to purchase. In response, the controller transmits, on behalf of a subsidizing vendor, an indication of an offer for a subsidy such as a reduction in the customer's purchase price.

If the customer accepts the offer, the controller provides, directly or indirectly, an amount of funds from the subsidizing vendor to the first vendor. The controller may retain a portion of the amount of funds as payment. The controller also facilitates a transaction between the customer and the subsidizing vendor. For example, the customer may be required to sign up for a service (e.g. credit card account service) that is provided by the subsidizing vendor. The controller may facilitate this transaction by providing a form for entry of customer information.

By having the controller manage such a system by acting between subsidizing vendors and vendors that are servicing customers, a vendor need only communicate with the controller, rather than a plurality of other vendors. Vendors likewise need only form one relationship with a central authority rather than with a plurality of other vendors. Furthermore, as new subsidizing vendors elect to participate, existing vendors automatically benefit from the new subsidies which may be possible.

BRIEF DESCRIPTION OF THE DRAWINGS

FIG. 4 is a representation of a customer database of the controller of FIG. 2.

FIG. 5 is a representation of a vendor database of the controller of FIG. 2.

FIG. 7 is a representation of a subsidizer database of the controller of FIG. 2.

FIG. 8 is a representation of an offer rules database of the controller of FIG. 2.

FIG. 9 is a representation of an offers database of the controller of FIG. 2.

FIG. 10 is a representation of a record of an offer summary database of the controller of FIG. 2.

FIG. 11 is a schematic illustration of an item database of the vendor server of FIG. 3.

FIG. 21 is a table illustrating data used when a subsidy amount is applied over time.

DETAILED DESCRIPTION OF THE PREFERRED EMBODIMENTS

Applicants have recognized that the acquisition budgets of various venders may be advantageously used to facilitate commerce. A customer that purchases items from a first vendor may be paid, directly or indirectly, by a second vendor, so that the customer pays a reduced price, perhaps nothing at all, for his desired items. In exchange, the customer participates or agrees to participate in a transaction with the second vendor. As used herein, this "transaction" may be any interaction with the second vendor. For example, the customer may be required to sign up for a service that is provided by the second vendor. Since many service providers are willing to pay significant amounts of money (e.g. often $50 to $200) to acquire a new customer, the ability to acquire a customer by essentially "intervening" in a sale between others can benefit all parties involved. The customer is benefited by the reduced price of his items, the first vendor is benefited by the increased sales and customer satisfaction that such an arrangement would bring, and the second vendor is benefited by the additional transaction, particularly the acquisition of a new customer in one embodiment.

In addition, applicants have also recognized that there are benefits to having a controller manage such a system by acting between subsidizing vendors and vendors that are servicing customers. For example, a vendor need only communicate with the controller, rather than with a plurality of other vendors. Vendors likewise need only form one relationship with a central authority rather than with a plurality of other vendors. Furthermore, as new subsidizing vendors elect to participate, existing vendors automatically benefit from the new subsidies which may be possible.

The controller of the present invention can also track customer information derived from several vendors, allowing subsidies to be better targeted to customers. The controller can also act to reduce or eliminate customer manipulation of subsidy offers. For example, the controller can identify a customer that attempts to merely collect subsidies by agreeing to participate in contradictory transactions, such as simultaneously agreeing to switch to two telephone service providers.

Figure 1:
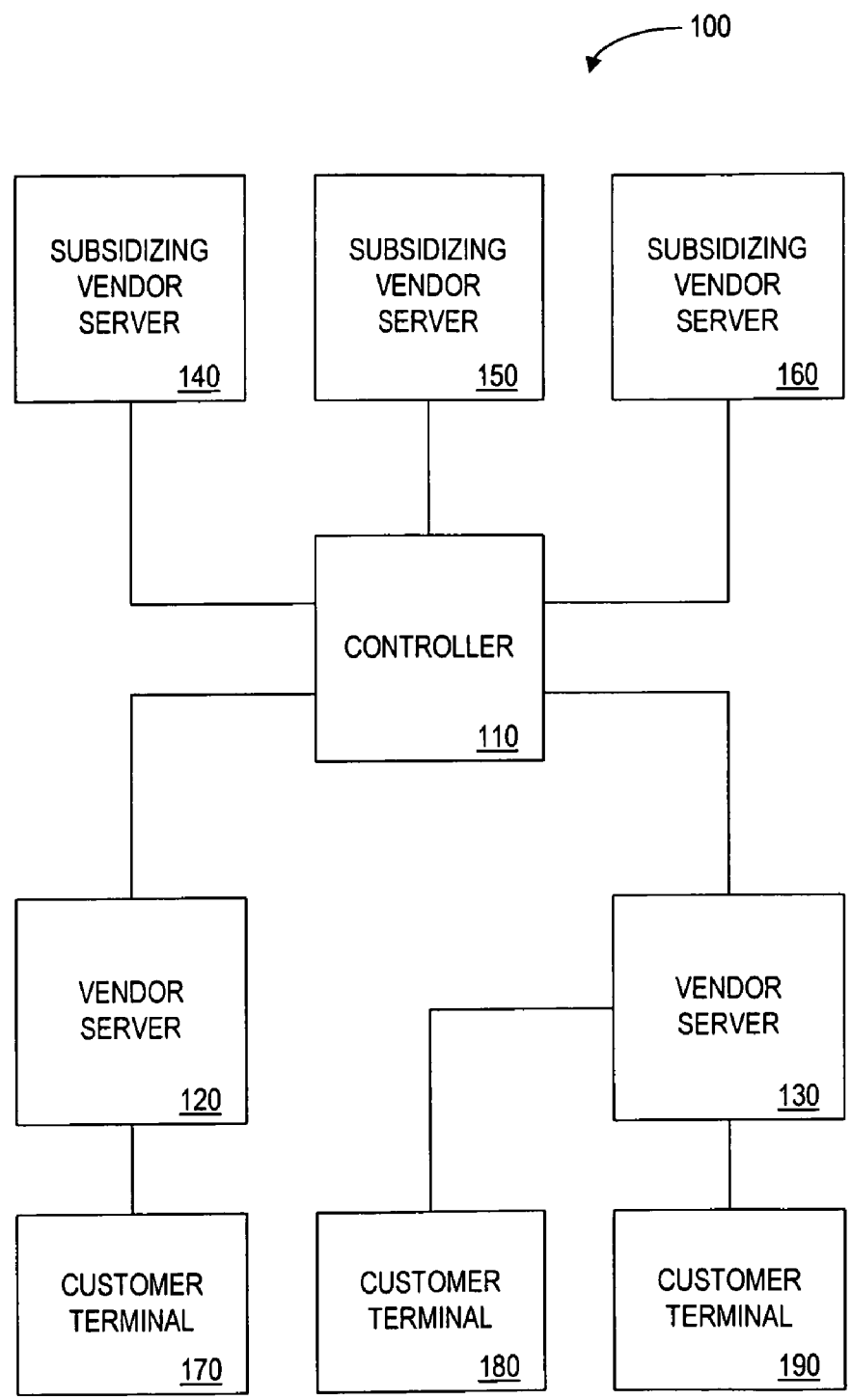
FIG. 1 is a schematic illustration of an apparatus for facilitating commerce in accordance with the present invention.

Referring to FIG. 1, an apparatus 100 includes a controller 110 that is in communication with vendor servers 120 and 130. The controller 110 and the vendor servers 120 and 130 may comprise computers, such as those based on an Intel® Pentium® microprocessor, that are adapted to communicate via the Internet (e.g. via a modem) or other medium. Any number of vendor servers may be in communication with the controller 110.

Each of the vendor servers 120 and 130 may be a "web server" of a vendor (e.g. a retail seller). A vendor server could then generate a web page that may be accessed via the World Wide Web and allow purchases from the vendor to be made in a manner known in the art. Alternatively, each of the vendor servers 120 and 130 may be a computer involved in operating a physical store. Such a computer, for example a point of sale (POS) server, would perform such tasks as inventory management and item pricing.

The controller 110 is also in communication with subsidizing vendor servers 140, 150 and 160. Each of the subsidizing vendor servers 140, 150 and 160 may comprise computers, such as those based on the Intel® Pentium® microprocessor, that are adapted to communicate via the Internet (e.g. via a modem) or other medium. Any number of subsidizing vendor servers may be in communication with the controller 110.

Each of the subsidizing vendor servers 140, 150 and 160 may be a "web server" of a vendor. A subsidizing vendor server could then generate a web page that may be accessed via the World Wide Web and allow transactions with the subsidizing vendor in a manner known in the art. Alternatively, each of the subsidizing vendor servers 140, 150 and 160 may be a computer involved in operating a physical store. Such a computer would perform such tasks as inventory management and item pricing.

A vendor server may be in communication with one or more customer terminals that transmit data on a customer transaction (e.g. a purchase). The vendor server 120 is in communication with a customer terminal 170, and the vendor server 130 is in communication with customer terminals 180 and 190. Any or all of the customer terminals 170, 180 and 190 may be point of sale (POS) terminals, such as the NCR 7454 manufactured by NCR Corporation or the IBM 4683 manufactured by International Business Machines. As is known in the art, POS terminals perform such processes as calculating the total price of a purchase (goods or services) and calculating the amount of change due to a customer. POS terminals may furthermore track purchases made and adjust databases of inventory accordingly.

In another embodiment, any or all of the customer terminals 170, 180 and 190 may be computers, such as those based on the Intel® Pentium® microprocessor, that are adapted to communicate via the Internet (e.g. via a modem) or other medium. Such computers are able to appropriately access a web page to communicate with a vendor server in a manner that is known to those skilled in the art.

In still other embodiments, any or all of the customer terminals 170, 180 and 190 may be telephones, vending machines, other devices that can receive payment from customers in exchange for providing goods or services, pagers or palmtop computers such as personal digital assistants (PDAs).

Figure 2:
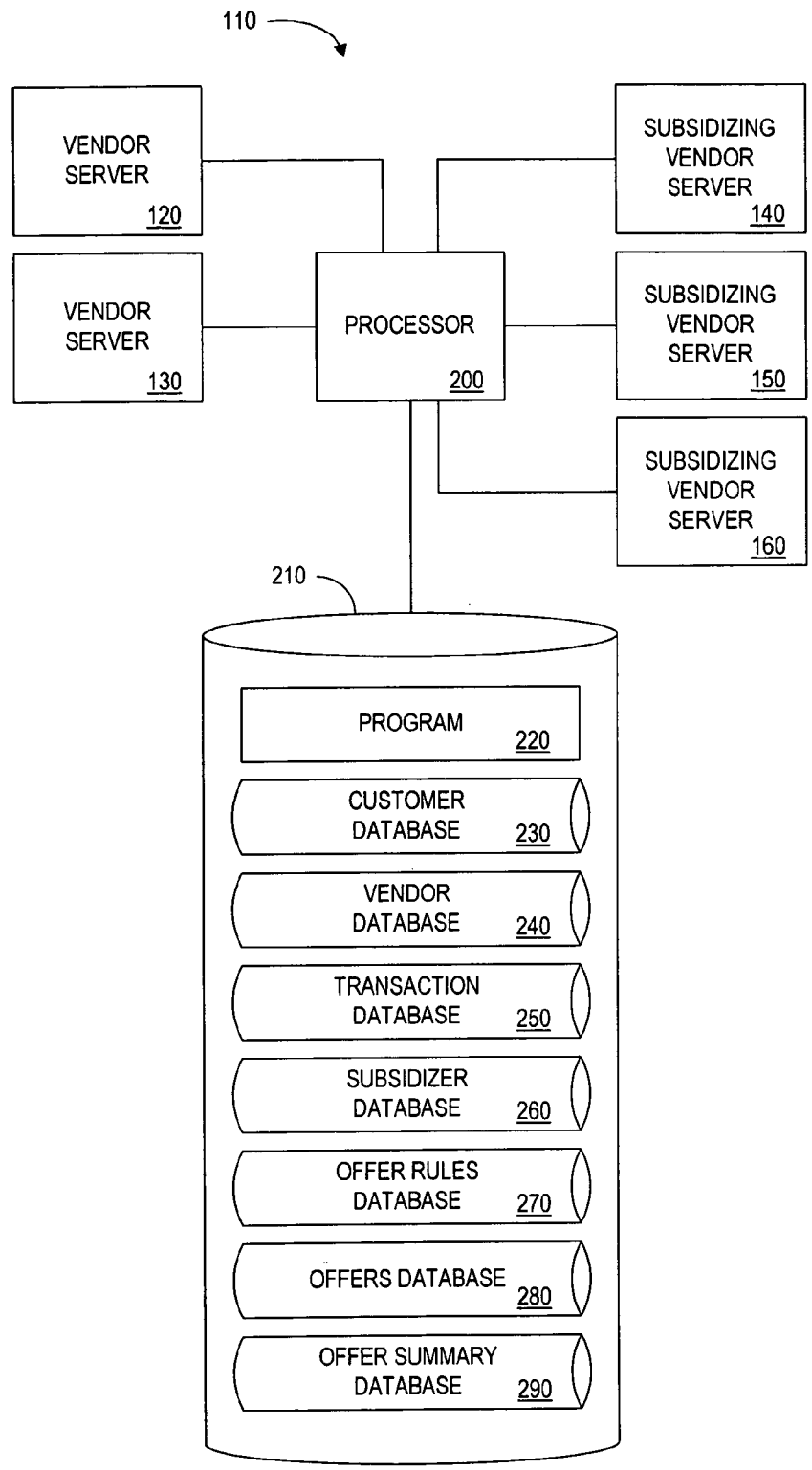
FIG. 2 is a schematic illustration of a controller of the apparatus of FIG. 1.

Referring to FIG. 2, the controller 110 comprises a processor 200, such as the Intel® Pentium® microprocessor. The processor 200 is in communication with a data storage device 210, such as an appropriate combination of magnetic, optical and/or semiconductor memory. For example, the data storage device 210 may comprise one or more of a ROM, RAM and hard disk. The processor 200 and the data storage device 210 may each be (i) located entirely within a single computer or other computing device; (ii) connected to each other by a remote communication medium, such as a serial port cable, telephone line or radio frequency transceiver; or (iii) a combination thereof. In one embodiment, the controller 110 may comprise one or more computers that are connected to a remote server computer for maintaining databases.

The data storage device 210 stores a program 220 for controlling the processor 200. The processor 200 performs instructions of the program 220, and thereby operates in accordance with the present invention, and particularly in accordance with the methods described in detail herein. The program 220 furthermore includes program elements that may be necessary, such as an operating system and "device drivers" for allowing the processor 200 to interface with computer peripheral devices. Appropriate device drivers and other necessary program elements are known to those skilled in the art, and need not be described in detail herein.

The storage device 210 also stores (i) a customer database 230, (ii) a vendor database 240, (iii) a transaction database 250, (iv) a subsidizer database 260, (v) an offer rules database 270, (vi) an offers database 280 and (vii) an offer summary database 290. The databases 230, 240, 250, 260, 270, 280 and 290 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 3:
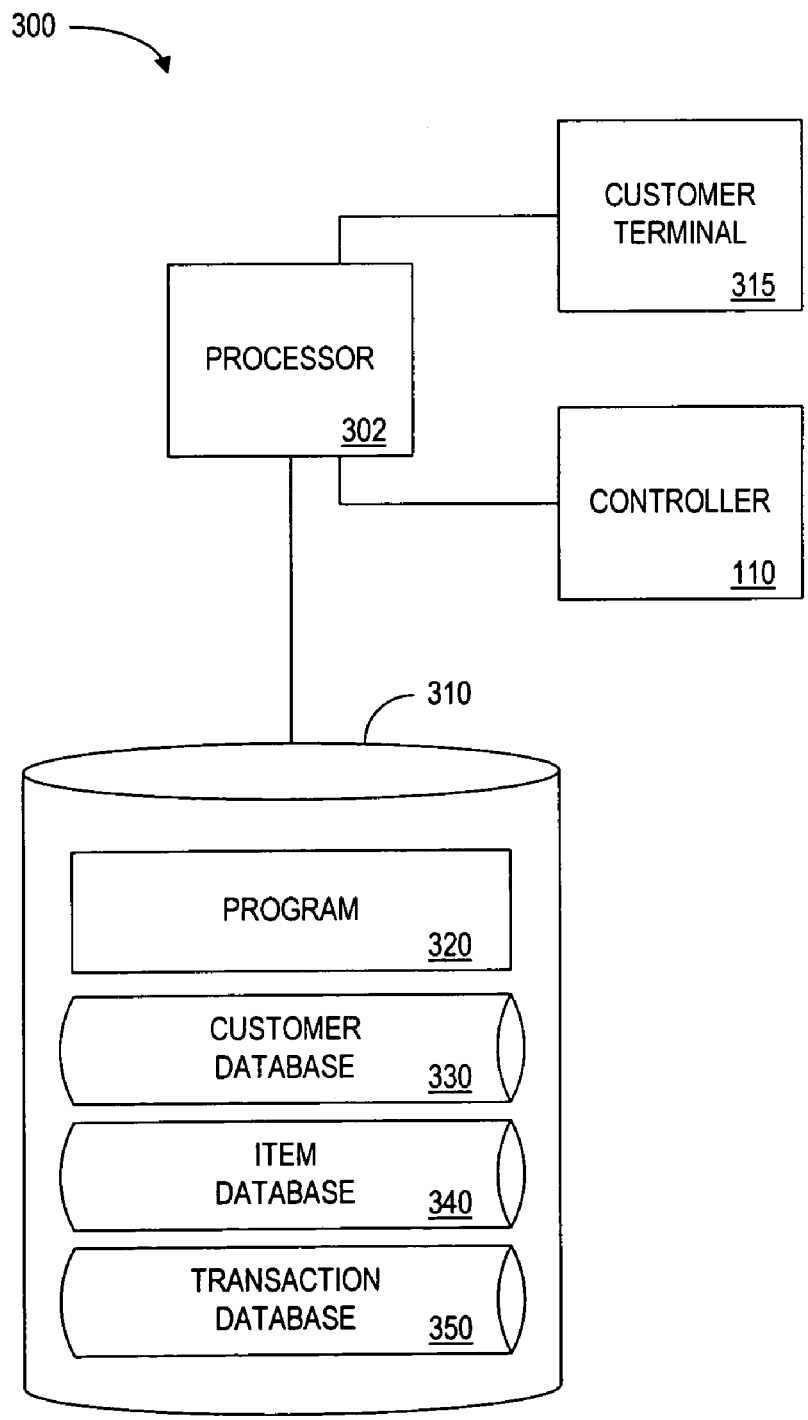
FIG. 3 is a schematic illustration of a vendor server of the apparatus of FIG. 1.

Referring to FIG. 3, a vendor server 300 is illustrative of the vendor servers 120 and 130 (FIG. 1). The vendor server comprises a processor 302, such as the Intel® Pentium® microprocessor, which is in communication with a customer terminal 315 and the controller 110. The processor 302 is also in communication with a data storage device 310, such as an appropriate combination of magnetic, optical and/or semiconductor memory. For example, the data storage device 310 may comprise one or more of a ROM, RAM and hard disk. The processor 302 and the data storage device 310 may each be (i) located entirely within a single computer or other computing device; (ii) connected to each other by a remote communication medium, such as a serial port cable, telephone line or radio frequency transceiver; or (iii) a combination thereof. In one embodiment, the vendor server 300 may comprise one or more computers that are connected to a remote server computer for maintaining databases.

The data storage device 310 stores a program 320 for controlling the processor 302. The processor 302 performs instructions of the program 320, and thereby operates in accordance with the present invention, and particularly in accordance with the methods described in detail herein. The program 320 furthermore includes program elements that may be necessary, such as an operating system and "device drivers" for allowing the processor 302 to interface with computer peripheral devices. Appropriate device drivers and other necessary program elements are known to those skilled in the art, and need not be described in detail herein.

The storage device 310 also stores (i) a customer database 330, (ii) an item database 340, and (iii) a transaction database 350. The customer database 330 and the transaction database 350 of the vendor server 300 may be similar or identical to the customer database 230 and transaction database 250 of the controller 110. For example, the controller 110 may store data that is derived from the vendor server 300, and vice versa. If each vendor server stores data on its own customers and its own transactions, the controller 110 could aggregate this data from each vendor server.

The databases 330, 340 and 350 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Referring to FIG. 4, a table 400 represents an embodiment of the customer database 230 (FIG. 2) and/or the customer database 330 (FIG. 3). The table 400 includes entries 402, 404, 406 and 408, each defining a customer that may purchase items from a vendor. Such information may be determined, for example, when a customer registers for a frequent shopper card. Those skilled in the art will understand that the table 400 may include any number of entries. The table 400 also defines fields for each of the entries 402, 404, 406 and 408. The fields specify (i) a customer identifier 420 that uniquely identifies the customer, (ii) a name 422 of the customer, (iii) a billing address 424 of the customer, (iv) credit card information 426 which may be used to render payment in purchasing the items, and (v) an electronic mail ("email") address 428 for communication with the customer.

Referring to FIG. 5, a table 500 represents an embodiment of the vendor database 240 (FIG. 2). The table 500 includes entries 502, 504, 506 and 508, each defining a vendor that services customers and may have those customers receive offers for subsidies. Such information may be determined when a vendor registers for participation in the subsidizing program described herein. Those skilled in the art will understand that the table 500 may include any number of entries. The table 500 also defines fields for each of the entries 502, 504, 506 and 508. The fields specify (i) a vendor identifier 520 that uniquely identifies the vendor, (ii) a vendor name 522, (iii) a vendor email address 524 for communication with the vendor, and (iv) an amount owed 526 to the vendor (e.g. promised but unpaid subsidy amounts).

Figure 6:
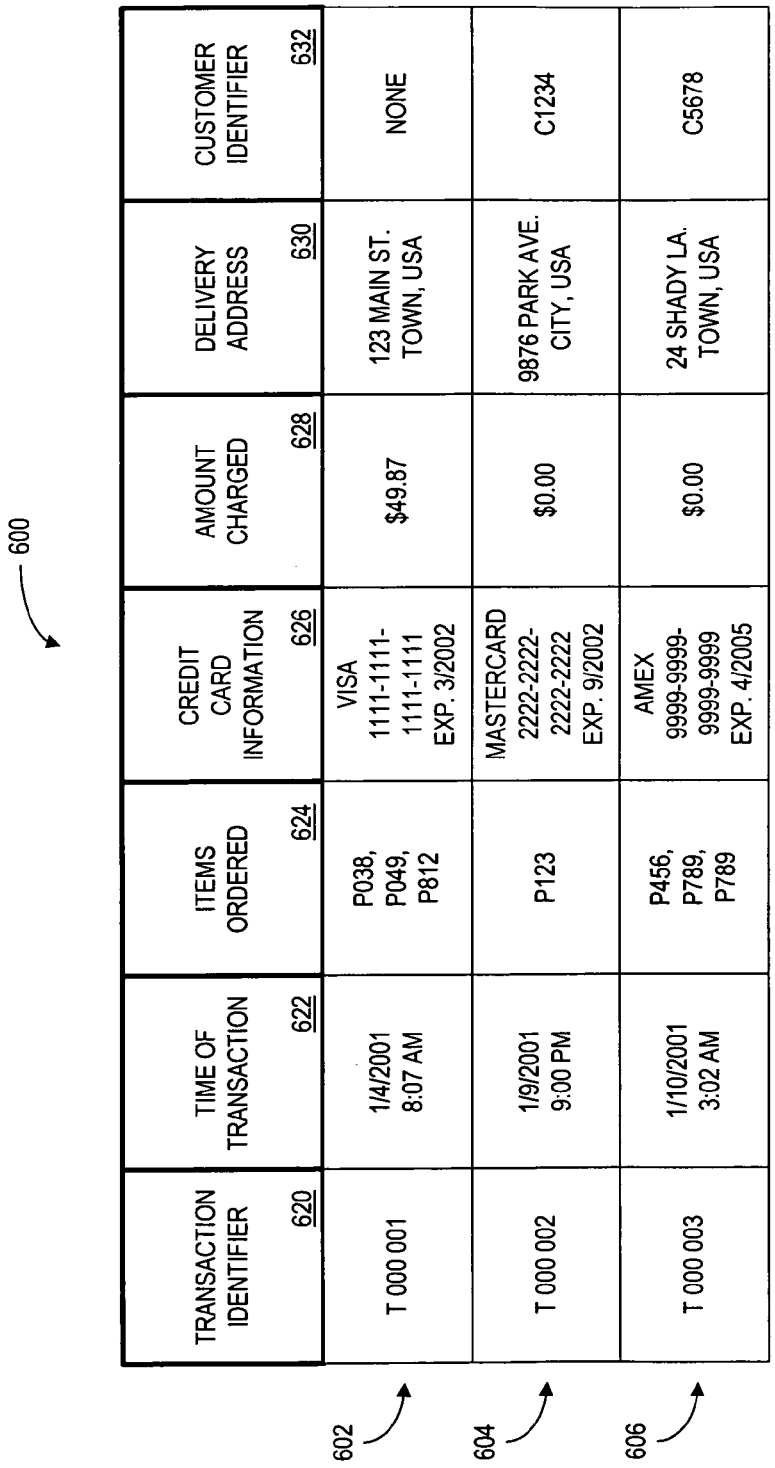
FIG. 6 is a representation of a transaction database of the controller of FIG. 2.

Referring to FIG. 6, a table 600 represents an embodiment of the transaction database 250 (FIG. 2) and/or the transaction database 350 (FIG. 3). The table 600 includes entries 602, 604 and 606, each defining a transaction with a vendor server. Typically, the transaction includes a purchase of items by a customer. Those skilled in the art will understand that the table 600 may include any number of entries. The table 600 also defines fields for each of the entries 602, 604 and 606. The fields specify (i) a transaction identifier 620 that uniquely identifies the transaction, (ii) a time 622 of the transaction, (iii) the items ordered 624, (iv) credit card information 626 that may define a credit card account that was charged to pay for the items purchased, (v) an amount charged 628 for the items, (vi) a delivery address 630 for the items, and (vii) a customer identifier 632 (if any) that identifies the customer that made the purchase. Other forms of payment may be used besides a credit card account. For example, debit accounts or "electronic cash" may be used to render payment.

Referring to FIG. 7, a table 700 represents an embodiment of the subsidizer database 260 (FIG. 2). The table 700 includes entries 702, 704 and 706, each defining a subsidizing vendor that may subsidize purchases. Such information may be determined when a subsidizing vendor registers for participation in the subsidizing program described herein. Those skilled in the art will understand that the table 700 may include any number of entries. The table 700 also defines fields for each of the entries 702, 704 and 706. The fields specify (i) a subsidizing vendor identifier 720 that uniquely identifies the subsidizing vendor, (ii) a name 722 of the subsidizing vendor, (iii) an account 724 used to pay for the subsidies, (iv) an amount owed 726 by the subsidizing vendor, and (v) a rank 728 used to prioritize subsidizing vendors and/or subsidies from those subsidizing vendors. The ranks may be established periodically (e.g. once per year) or substantially continuously based on various criteria. For example, the ranks may be adjusted dynamically based on the acceptance rates of offers from the subsidizing vendors and/or amount of funds the subsidizing vendors have provided in connection with their offers.

Referring to FIG. 8, a table 800 represents an embodiment of the offer rules database 270 (FIG. 2). The table 800 includes entries 802, 804, 806, 808 and 810, each defining an offer rule. When an offer rule is satisfied during a transaction, the vendor provides an offer for a specified benefit, such as a subsidy. Such information may be determined when a subsidizing vendor registers for participation in the subsidizing program described herein. Those skilled in the art will understand that the table 800 may include any number of entries. The table 800 also defines fields for each of the entries 802, 804, 806, 808 and 810. The fields specify (i) an offer rule identifier 820 that uniquely identifies the offer rule, (ii) a subsidizing vendor identifier 822 that uniquely identifies the subsidizing vendor, (iii) a subsidy amount 824, (iv) when the offer rule is effective 826 (i.e. when the offer rule is satisfied), and (v) an additional transaction 828 that is required of the customer in exchange for the subsidy. As described below, several types of transactions, such as additional purchases or initiating service agreements, may be required of the customer.

Referring to FIG. 9, a table 900 represents an embodiment of the offers database 280 (FIG. 2). The table 900 includes entries 902, 904, 906, 908 and 910, each defining an offer for a subsidy. The offer was provided to a customer during a transaction of the customer with the vendor. Those skilled in the art will understand that the table 900 may include any number of entries. The table 900 also defines fields for each of the entries 902, 904, 906, 908 and 910. The fields specify (i) an offer identifier 920 that uniquely identifies the offer, (ii) a transaction identifier 922 that uniquely identifies the transaction during which the offer was provided, (iii) a subsidizing vendor identifier 924 that uniquely identifies the subsidizing vendor, (iv) an identifier of an offer rule 926 that was applied during the transaction, (v) a subsidy amount 928, (vi) a total price 930 that the customer would have to pay without the subsidy, (vii) a total price 932 that the customer would have to pay with the subsidy, and (viii) whether the offer was accepted 934. As described above with reference to FIG. 8, offer rules define specific subsidies. Thus, the identifier of an offer rule stored in field 926 may be used to determine a corresponding subsidy amount.

Referring to FIG. 10, a table 1000 represents a record of an embodiment of the offer summary database 290 (FIG. 2). The offer summary database 290 typically includes a plurality of records, each defining a summary of offers for subsidies that have been provided on behalf of a subsidizing vendor. The table 1000 includes a subsidizing vendor identifier 1002 that uniquely identifies the subsidizing vendor, a total number of offers provided 1004 on behalf of the subsidizing vendor, a total number of those offers that were accepted 1006, and a total amount 1008 of the subsidies due in connection with accepted offers.

The table 1000 also includes entries 1010 and 1012, each defining offers provided due to satisfaction of an offer rule of the subsidizing vendor. Those skilled in the art will understand that the table 1000 may include any number of entries. The table 1000 also defines fields for each of the entries 1010 and 1012. The fields specify (i) an offer rule identifier 1020 that uniquely identifies the offer rule, (ii) a number 1022 of offers provided due to the offer rule, (iii) a number 1024 of these offers that were accepted, (iv) an amount 1026 of the subsidies due in connection with these accepted offers. If desirable, the information stored in the offer summary database 290 (FIG. 2) may be organized by the vendor through which the offer was provided. Such an embodiment would allow a comparison of the acceptance rate (number of offers accepted/number of offers provided) of offers at different vendors.

Referring to FIG. 11, a table 1100 represents an embodiment of the item database 340 (FIG. 3). The table 1100 includes entries 1102 and 1104, each defining an item sold via a vendor server. Those skilled in the art will understand that the table 1100 may include any number of entries. The table 1100 also defines fields for each of the entries 1102 and 1104. The fields specify (i) a item identifier 1120 that uniquely identifies the item, (ii) an item description 1122, (iii) an item price 1124 for which the item is typically sold, and (iv) an availability 1126 of the item which may be based on an inventory level of the item.

Figure 12:
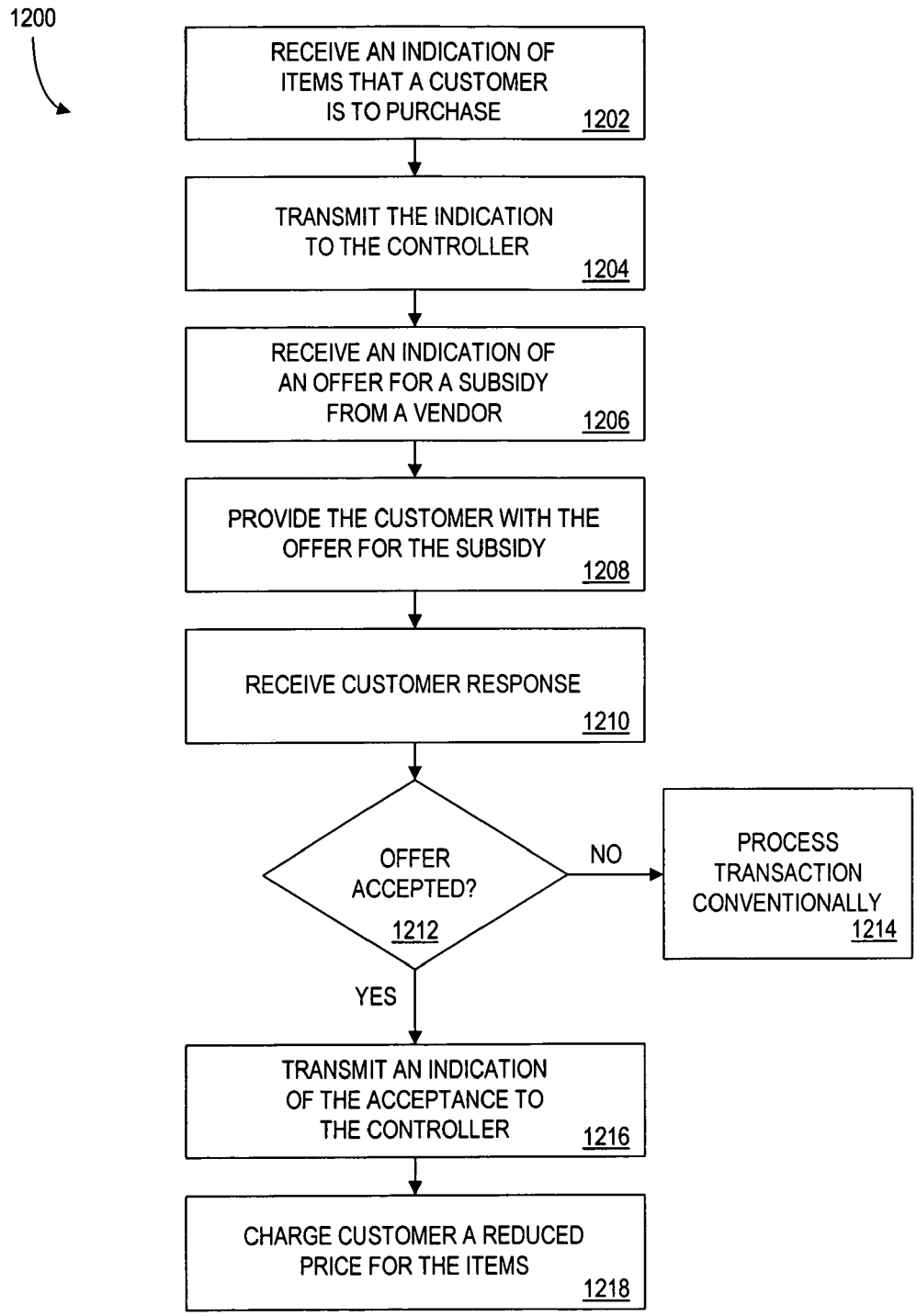
FIG. 12 is a flow chart illustrating an embodiment of a method, performed by a vendor server, for providing an offer for a benefit.

Referring to FIG. 12, a flow chart 1200 illustrates an embodiment of a method for providing an offer for a benefit (e.g. a reduced price) to a customer that is to purchase items from a vendor. In one embodiment, the illustrated method is performed by a vendor server after the customer has accessed a web page generated and/or controlled by the vendor server. In another embodiment, the illustrated method is performed by a vendor server after a customer brings items he wishes to purchase to a POS terminal.

The vendor server receives an indication that the customer is to purchase items from the web site of the vendor (step 1202). For example, after a customer accesses a web site of the vendor, the customer may select one or more items to purchase, and "click" a button that indicates that the customer desires to purchase the selected items. The act of clicking could generate a signal that the vendor server interprets as an indication that the customer is to purchase the selected items. In another embodiment, the act of accessing the web site could generate a signal that the vendor server interprets as an indication that the customer is to purchase the selected items. In yet another embodiment, a bar code scanner reads bar codes on items the customer brings to a POS terminal. The bar code scanner then generates a signal that the vendor server interprets as an indication that the customer is to purchase the selected items. The item database 340 (FIG. 3) would provide relevant details about each indicated item. Those skilled in the art will understand still other types of appropriate indications.

The vendor server then transmits the indication of the items to the controller 110 (step 1204). In response, the controller transmits and the vendor server receives an indication of an offer for a subsidy from a subsidizing vendor (step 1206). This indication may include an indication of a subsidy amount. For example, referring again to FIG. 8, the field 824 specifies a subsidy amount for an offer rule, and such data could be included in the indication of an offer for a subsidy. The indication may also include an indication of a transaction the customer is required to perform in exchange for receiving the subsidy amount. The field 828 (FIG. 8) specifies such a required transaction.

The vendor server provides the customer with an offer for the subsidy (step 1208). For example, the POS terminal may display a textual representation of the offer, which is read by the customer or read to the customer by a cashier. In another embodiment, the web page may display text describing the subsidy. The web page may be dynamically modified to include a button that, when clicked, indicates acceptance of an offer for a subsidy. Alternatively, the offer may be transmitted to the customer via email, telephone or other means.

A response to the offer is received (step 1210). For example, the customer or cashier may actuate a button that generates a representative signal for the POS terminal. In another embodiment, the customer may click a button on the web page or click on a hyperlink on the web page. If it is determined that the offer is not accepted (step 1212), then the transaction is processed conventionally (step 1214). For example, the items are to be purchased for the conventional total price, a credit card number is received and the corresponding credit card account is charged appropriately.

If it is determined that the offer is accepted (step 1212), then an indication of the acceptance is transmitted to the controller 110 (step 1216) and the customer is charged a reduced price for the items (step 1218). Charging a reduced price may comprise charging the conventional (i.e. unreduced) price followed by crediting the customer a discount amount. For example, if the items are normally sold for $25 (as determined by prices specified by the item database 340), then $25 is charged to a credit card account of the customer, and a discount amount (perhaps $25 as well) is credited to the credit card account.

Figure 13:
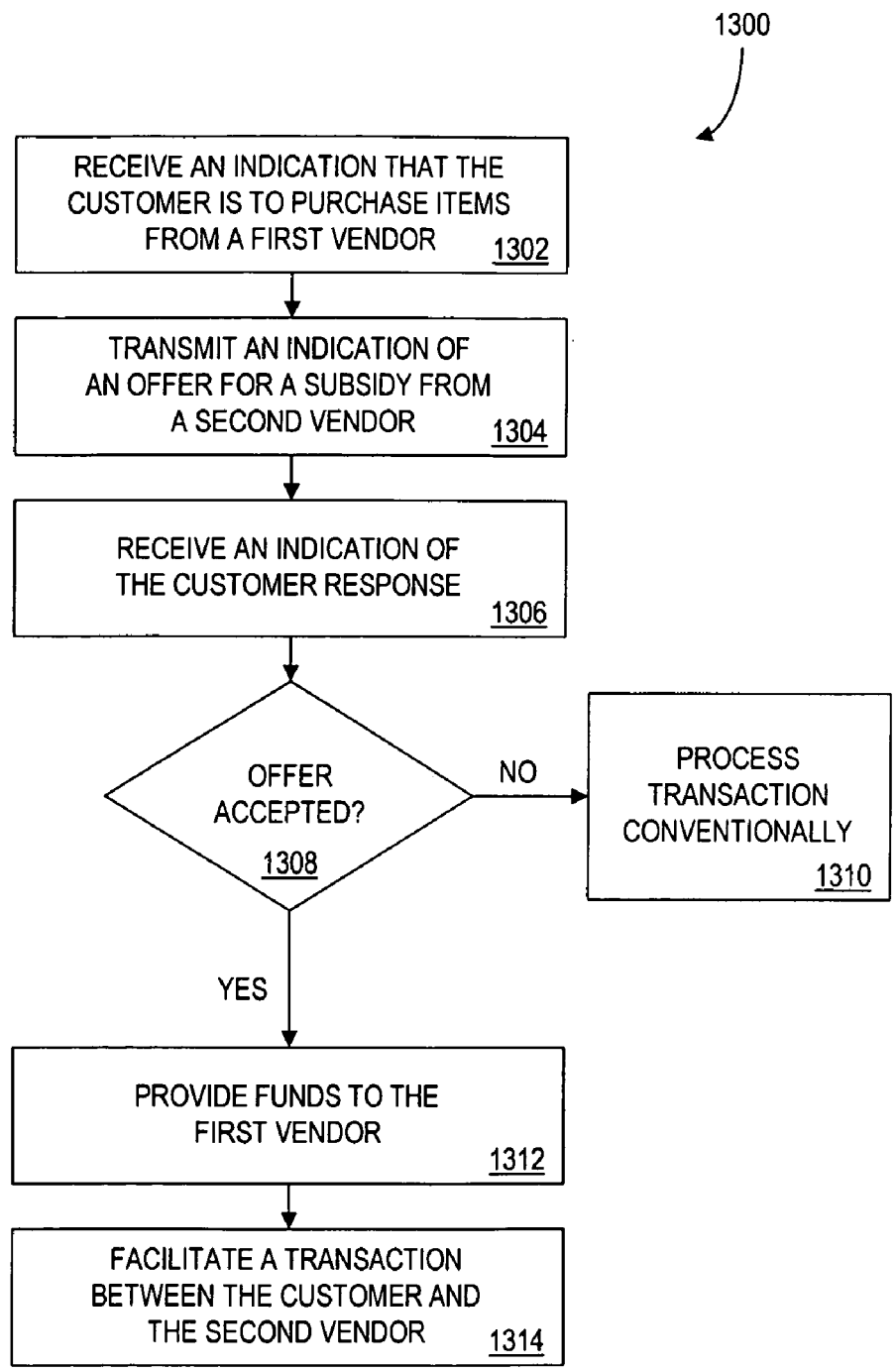
FIG. 13 is a flow chart illustrating an embodiment of a method, performed by the controller of FIG. 2, for providing an offer for a benefit.

Referring to FIG. 13, a flow chart 1300 illustrates an embodiment of a method for providing an offer for a benefit to a customer. In one embodiment, the controller 110 (FIG. 1) performs the illustrated method after the customer has accessed a web page generated and/or controlled by the vendor server. In another embodiment, the controller 110 performs the illustrated method after a customer brings items he wishes to purchase to a POS terminal.

The controller 110 receives an indication that the customer is to purchase items from a first vendor (step 1302). For example, a customer may bring items to purchase to a POS terminal, at which point the items are scanned by a bar code scanner. The POS terminal in turn transmits an indication of the items to the vendor server, which in turn transmits the indication to the controller 110 (step 1204 of FIG. 12), which receives the indication. In another embodiment, after the customer accesses a web site, the customer may select one or more items to purchase, and "click" a button that indicates that the customer desires to purchase the selected items. The act of clicking could generate a signal that is transmitted via the vendor server to the controller 110. Alternatively, the customer terminal may include "client-side" software that detects various types of customer activity and in response generates signals and transmits the signals via the vendor server to the controller 110. The controller 110 interprets the signal as an indication that the customer is to purchase the selected items. In another embodiment, the act of accessing the web site could generate a signal that the controller 110 interprets as an indication that the customer is to purchase the selected items. Those skilled in the art will understand still other types of appropriate indications.

In response to the indication that the customer is to purchase items from the first vendor, the controller 110 transmits to the vendor server an indication of an offer for a subsidy from a second vendor (step 1304). The controller 110 may then create an entry in the offers database 280 (FIG. 2) to record the offer. In particular, the total price with subsidy may be calculated by subtracting the subsidy amount from the total price of the items. The controller 110 may also create an appropriate record of the offer summary database 290 (FIG. 2). The controller 110 subsequently receives an indication of the customer response (step 1306) from the vendor server. This response is also recorded in the appropriate entry of the offers database 280. If the customer did not accept the offer (step 1308), the transaction is processed conventionally (step 1310).

If the customer accepted the offer, the controller 110 provides funds to the first vendor (step 1312). As described below, the funds provided to the first vendor may equal or exceed the amount of reduction in price of the customer's purchase. The controller 110 may provide funds a short time after the offer is accepted (e.g. substantially immediately). Alternatively, the controller 110 may provide funds periodically (e.g. in accordance with a periodic remittance cycle). For example, the controller 110 may maintain a running balance of funds owed to various vendors. At the end of the month, the controller would transmit the aggregate amount to the appropriate vendor or vendors. The step of providing funds may comprise crediting an account corresponding to the first vendor. Alternatively, providing funds may comprise initiating a transfer of funds (e.g. a "wire transfer") to an account corresponding to the first vendor.

In another embodiment described in the parent application, U.S. patent application Ser. No. 09/219,267 entitled "METHOD AND APPARATUS FOR FACILITATING ELECTRONIC COMMERCE THROUGH PROVIDING CROSS-BENEFITS DURING A TRANSACTION", filed on Dec. 23, 1998, the controller 110 provides funds to the customer by crediting an account of the customer.

In exchange for the subsidy, the customer is obligated to participate in a transaction with the second vendor. Accordingly, the controller 110 facilitates the required transaction between the customer and the second vendor (step 1314). For example, the controller 110 may provide, directly or indirectly, a form for the customer to complete. In another embodiment, the controller 110 may initiate the transfer of information about the customer (e.g. a service provider of the customer) to the second vendor. The controller may record each interaction with a customer in the transaction database 250 (FIG. 2).

Figure 14:
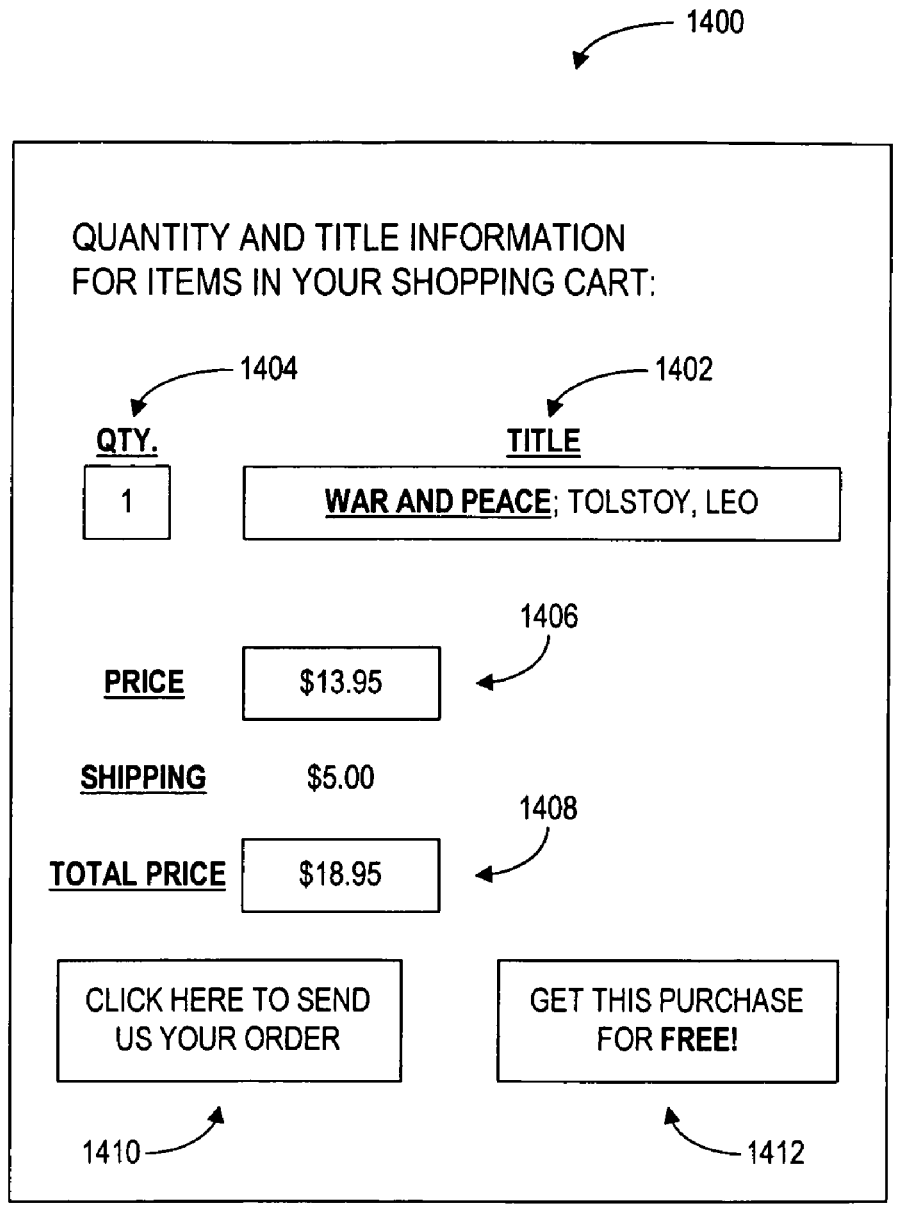
FIG. 14 is an exemplary web page.

Referring to FIG. 14, an exemplary web page 1400 illustrates a possible means for providing an offer for a benefit and receiving an acceptance of the offer. The web page 1400 illustrates an embodiment in which the vendor sells books via the World Wide Web. A book that the customer is ready to purchase is indicated by text 1402, and a quantity of that book (one book in FIG. 14) is indicated by text 1404. A price of the books is indicated by text 1406, and similarly a total price (e.g. the sum of item prices and any other prices) due from the customer is indicated by text 1408.

A button 1410 is clicked by the customer if the customer desires to purchase the specified items and thereby consummate the purchase. Upon clicking the button 1410, the items may be immediately deemed as having been purchased by the customer. A button 1412 is clicked by the customer if the customer desires to accept an offer for a subsidy. Alternatively, actuating the button 1412 may indicate that the customer is interested in further information regarding an offer for a subsidy, and the customer may subsequently indicate whether he accepts the offer.

Figure 15:
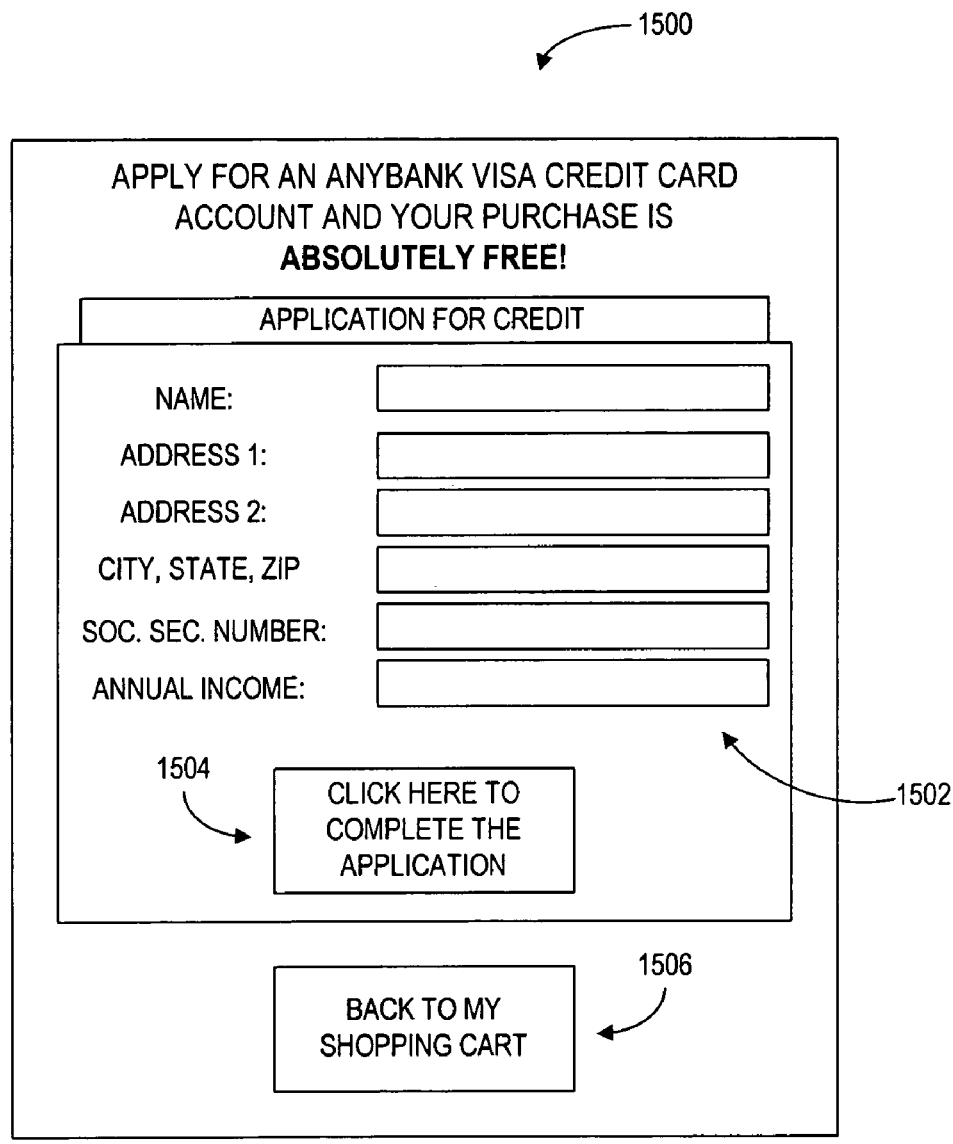
FIG. 15 is another exemplary web page.

Referring to FIG. 15, a second exemplary web page 1500 allows the customer to provide customer information via a form having fields 1502 that receive entered text. The customer information is used in applying for a credit card account with a credit card issuer. In one embodiment, the web page 1500 may be displayed after the customer clicks the button 1412 of FIG. 14. Information that is entered via the web page 1500 may be transmitted to the controller 110 upon actuation of a button 1504. Actuation of the button 1504 may furthermore indicate acceptance of the offer for the subsidy. For example, actuation of the button 1504 may indicate a willingness to apply for a credit card account, or that the customer has applied for the credit card account. Conversely, actuation of the button 1506 may indicate rejection of the offer for the subsidy.

Figure 16:
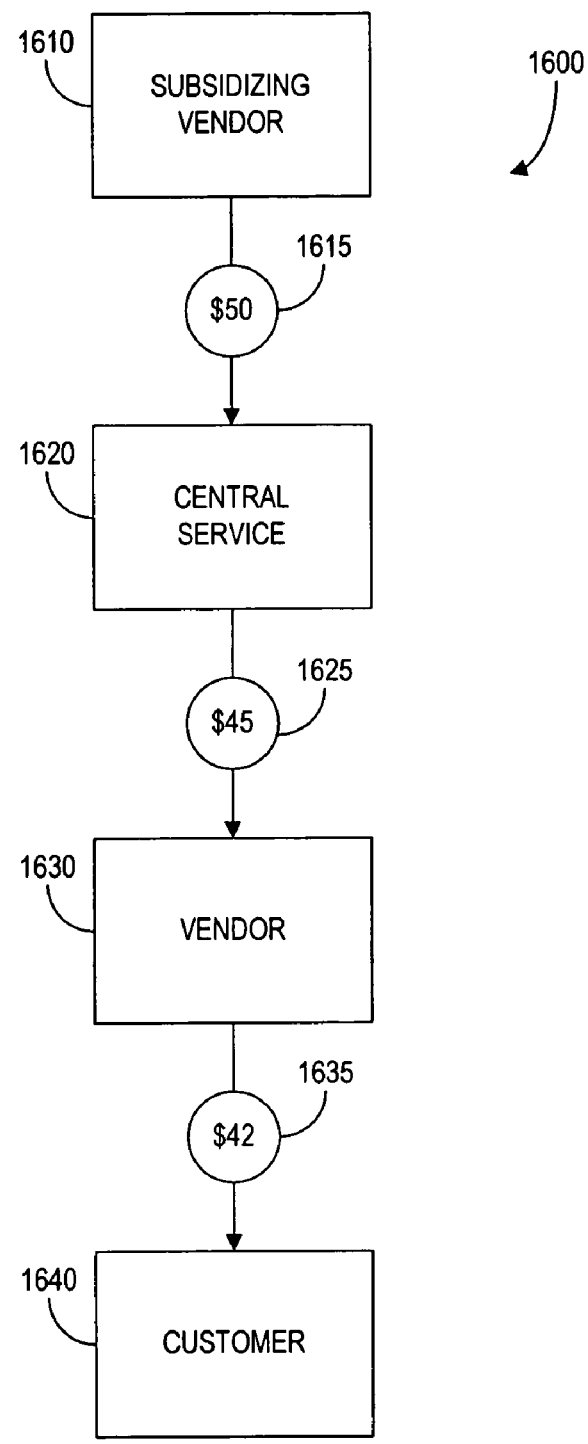
FIG. 16 is a flow diagram illustrating the transfer of funds among parties in accordance with the present invention.

Referring to FIG. 16, a flow diagram 1600 illustrates the transfer of funds among parties in accordance with the present invention. A subsidizing vendor 1610 provides an amount 1615 of $50 to a central service 1620 (i.e. the entity that controls or operates the controller 110). The central service 1620 in turn provides an amount 1625 of $45 to a vendor 1630. The vendor 1630 in turn provides an amount 1635 of $42 to its customer 1640. In the illustrated flow diagram 1600, the central service 1620 and the vendor 1630 each retain a portion of the funds received from the subsidizing vendor 1610. In particular, the central service 1620 retains $5 ($5=.$50–$45) and the vendor 1630 retains $3 ($3=$45–$42). The difference between the funds received by a party ("funds in") and the funds provided by a party ("funds out") in connection with a subsidy may depend on various criteria. In one embodiment, the funds out are a predetermined amount less than the funds in. For example, the central service 1620 may deduct $5 from each amount provided by the subsidizing vendor 1610. In another embodiment, the funds out are a predetermined percentage of the funds in. For example, the vendor 1630 may deduct 5% of the funds in, and thus the funds out form the vendor would be 95% of the funds in to the vendor. Those skilled in the art will realize still other ways to calculate the difference between the funds received by a party and the funds provided by a party in connection with a subsidy.

The amount of funds that are retained by the vendor 1630 may be based on the amount provided by the subsidizing vendor 1610 and the purchase price of the customer 1640. For example, if the subsidizing vendor 1610 is willing to provide $50, yet the customer's purchase price is only $20, the difference of $30 ($30=$50–$20) may be retained by the central service 1620 and/or the vendor 1630. The $30 may be allocated among the two parties 1620 and 1630 in numerous manners. For example, one party may retain a fixed amount (e.g. $5) and the other party retains the remainder.

In one embodiment, the central service 1620 retains the excess between the purchase price of the customer and the amount provided by the subsidizing vendor. This amount may be used to augment other offers for subsidies. For example, if a subsidizing vendor is willing to provide $50 per customer, and a first customer's purchase price is only $20, then the difference of $30 may be retained by the subsidizing vendor. A second customer having a purchase price of $80 could then receive his items for free, since the subsidy of $50 together with the retained $30 can offset the $80 purchase price.

Similarly, the amounts retained from numerous transactions may be used to offset other purchase prices. The amounts retained may be collected into a "pool" of funds with which to increase specific subsidy amounts, e.g., subsidy amounts for purchase prices which exceed a base subsidy amount. Furthermore, historical data on past transactions can permit efficient selection of future transactions that should receive "augmented" subsidy amounts from the pool of funds. For example, historical data can indicate the average transaction amount expected, as well as the expected number of subsequent transactions that will be in a predetermined range of prices. Thus, the most efficient allocation of the pool of funds among future transactions may be determined a priori.

Figure 17A:
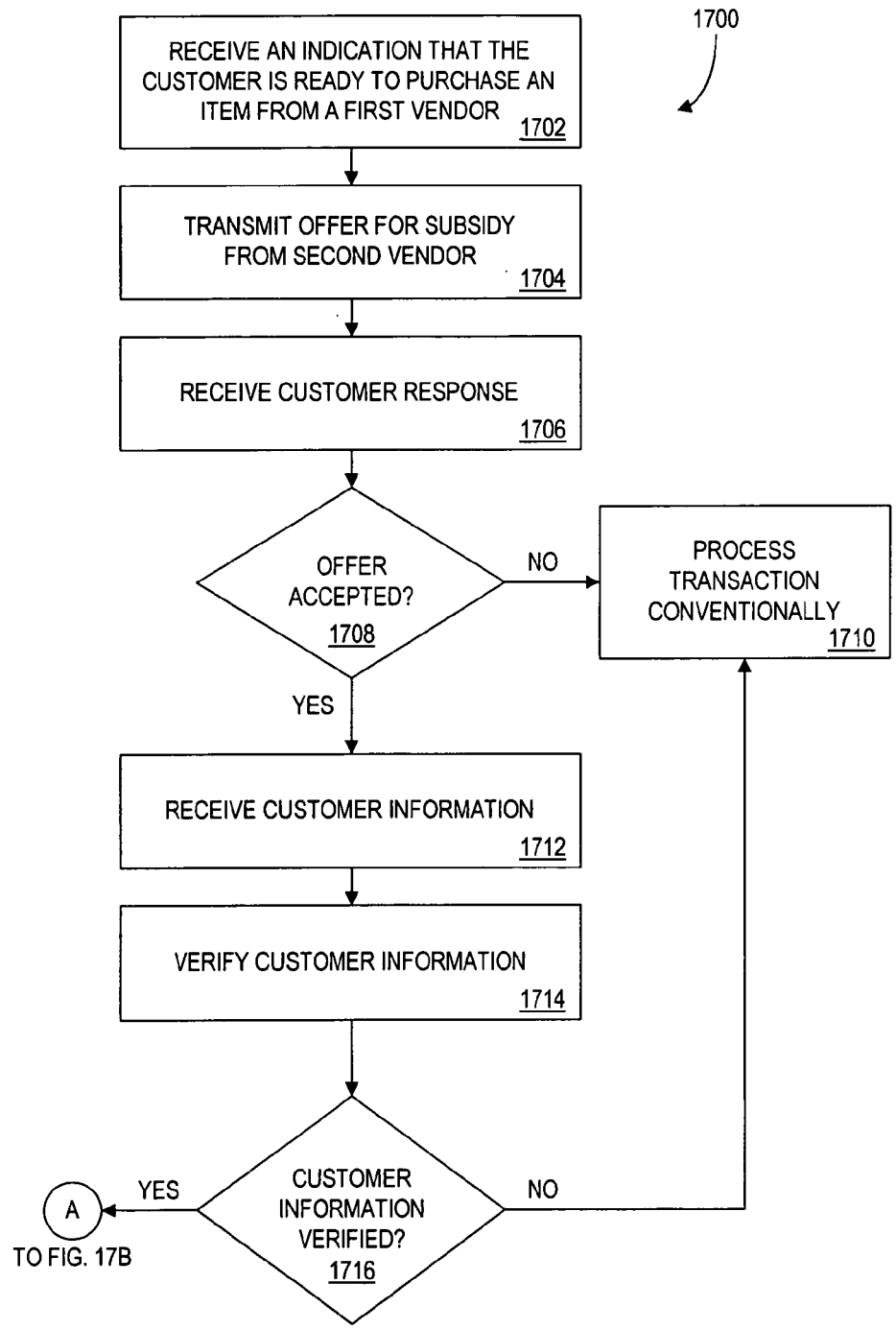
FIGS. 17A and 17B are a flow chart illustrating another embodiment of a method for providing an offer for a benefit to a customer.
Figure 17B:
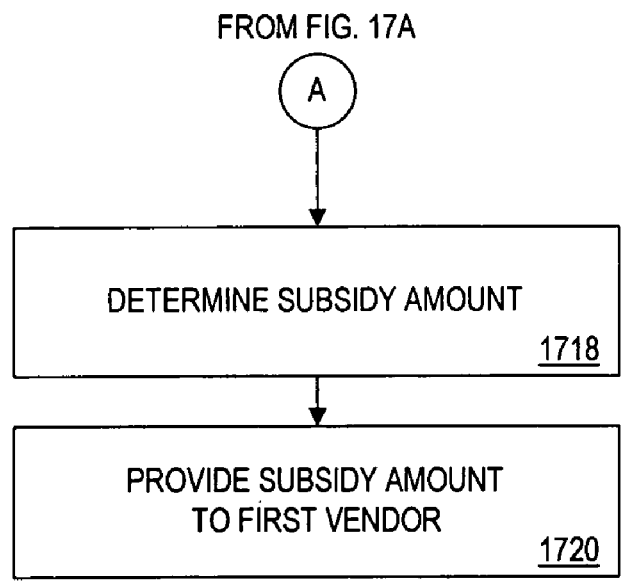

Referring to FIGS. 17A and 17B, a flow chart 1700 illustrates another embodiment of a method for providing an offer for a benefit to a customer that is to purchase items from a vendor. The controller 110 receives an indication that the customer is ready to purchase items from the web site of a first vendor (step 1702). A customer may indicate his readiness to purchase by, for example, selecting items to purchase and actuating a specific button that consummates the purchase of the items. Before the customer purchases the items, the controller 110 transmits to the vendor server an indication of an offer for a subsidy from a second vendor (step 1704). Subsequently, a response from the customer is received (step 1706) via the vendor server. For example, the customer may verbally indicate his response to a cashier, the cashier actuates a corresponding button on his POS terminal, and the POS terminal transmits a signal representing the response to the vender server.

If it is determined that the offer is not accepted (step 1708), then the transaction is processed conventionally (step 1710). If however it is determined that the offer is accepted (step 1708), then customer information is received (step 1712). Such customer information may be used in providing or facilitating an additional transaction that is required of the customer in exchange for the subsidy.

In one embodiment described in further detail below, in exchange for the subsidy the customer agrees to initiate a new service agreement, so that a service is provided by the second vendor. Accordingly, the customer information may comprise an indication of a service that is provided to the customer (e.g. whether the customer has cable television service), or a service provider that provides a service to the customer (e.g. which company provides cable television service to the customer). The additional transaction may occur after a significant amount of time has elapsed. Accordingly, in one embodiment there is a means for determining if the future action has occurred.

Furthermore, a penalty may be assessed against the customer if the customer does not perform the required additional transaction. For example, the subsidy to the customer may be canceled and the transaction may then be processed conventionally. Alternatively, a penalty fee may be charged to the customer.

Similarly, a penalty could be assessed if another imposed condition is violated. For example, a penalty could be assessed if the items are purchased and then returned. Similarly, a returnable purchase could be made a non-returnable purchase in exchange for the subsidy or other benefit. Still another penalty would be to prevent the customer from receiving subsidies from any merchant in the future. Such "blacklisting" could be readily administered by the central controller 110, which can store, for each customer, an indication of whether the customer has been blacklisted and subsequently identify customers that have been blacklisted.

The customer information may be received from the customer. In one embodiment, the controller 110 can send a request via the vendor server that the customer provide customer information. For example, the controller 110 may transmit a form (e.g. via a web site) including questions to be answered. In response, the vendor server would receive answers to the questions, and these answers would constitute the customer information from the customer.

In another embodiment, the customer information may be received from a party other than the customer. For example, information regarding the customer may be received from a third-party database (e.g. a list of addresses to provide a location of the customer, a credit reporting agency). Alternatively, customer information may be received from an ISP (Internet Service Provider), which can provide information such as an Internet address (e.g. email address or IP address) of the customer.

In still another embodiment, the customer information may be received via a "cookie" stored on a customer terminal (e.g. a computer of the customer). Those skilled in the art will understand that a great variety of data may be stored in such cookies, and information may be stored in the cookie in response to various events such as the web sites that have been visited by the customer.

In another embodiment, the customer information may comprise the telephone number of the customer, as determined from an ANI (Automatic Number Identification) signal received from a telephone the customer has used.

Once customer information is received, it may be stored by the controller in the customer database 230 (FIG. 2). Accordingly, information stored in this manner would be more readily accessible in the future, even by new vendors and subsidizing vendors that had not previously interacted with the customer.

The controller 110 may verify whether the customer information is accurate and complete (step 1714). For example, if the information is provided by the customer, it can be advantageous to assure that the customer information is not false. To provide a further incentive for the customer to provide accurate customer information, a penalty may be assessed against the customer if the customer information is not accurate. For example, if it is determined that the customer information is not accurate (step 1716), the subsidy to the customer may be canceled and the transaction is processed conventionally (step 1710). Alternatively, a penalty fee may be charged to the customer if it is determined that the customer information is not accurate. In such an embodiment, it may be further advantageous to verify the customer information before the purchase is consummated. Thus, the threat that the subsidy will not be forthcoming can encourage the customer to provide accurate and complete information.

If it is determined that the customer information is accurate (step 1716), then the controller 110 determines the amount of the subsidy (step 1718). The subsidy amount is typically stored in the offer rules database 270 (FIG. 2). The subsidy amount may be, for example, a predetermined amount or a predetermined percentage (e.g. a predetermined percentage of the total price). In one embodiment, the subsidy amount may also be limited, such that the price charged cannot be lower than zero (i.e. the subsidy may not include a credit). For example, a subsidy amount may be "up to $100 off, but no more than the total price". The subsidy amount is provided to the first vendor (step 1720) as described above with respect to step 1312 of FIG. 13.

Figure 18A:
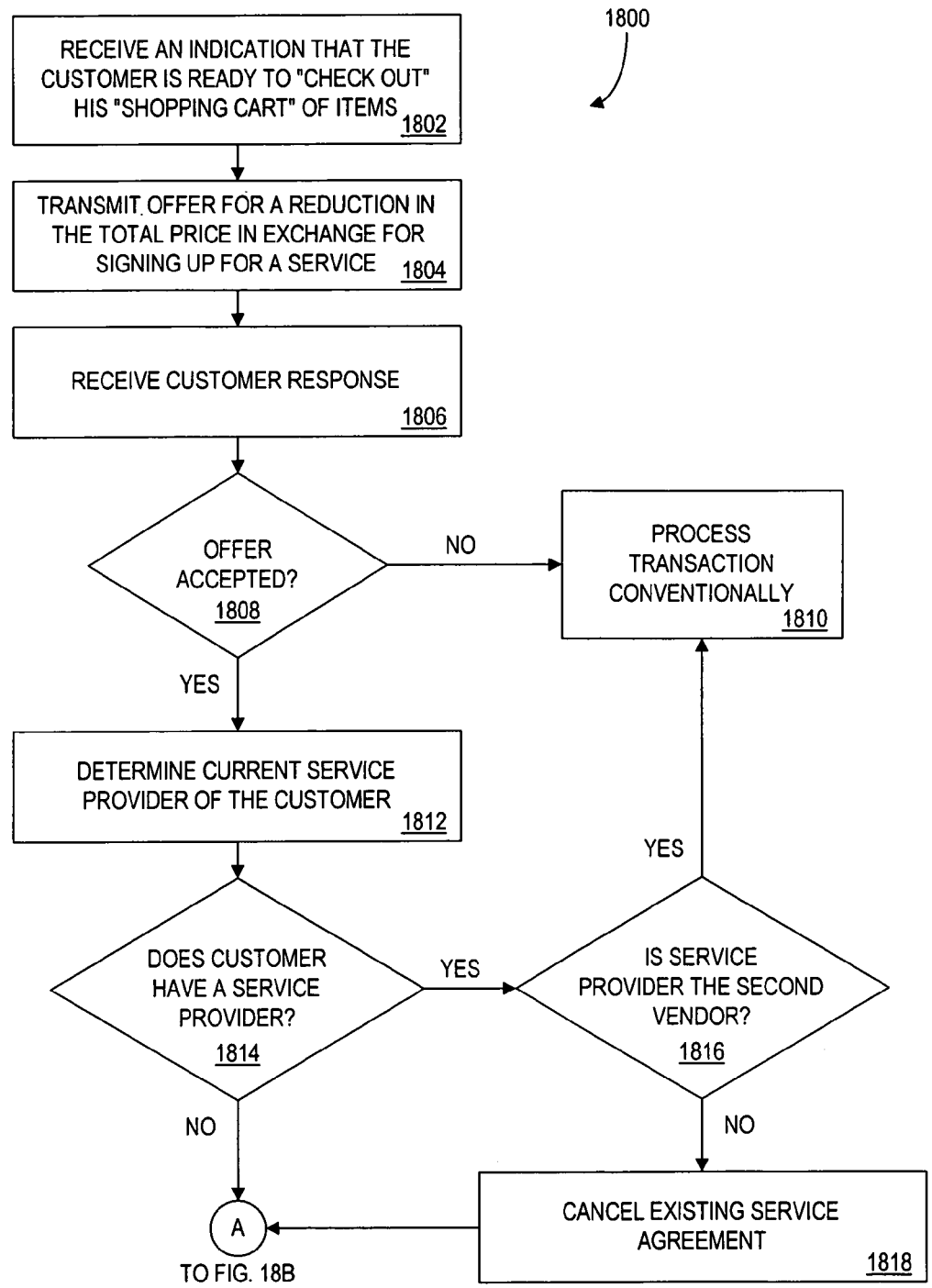
FIGS. 18A and 18B are a flow chart illustrating another embodiment of a method for providing an offer for a benefit to a customer.
Figure 18B:
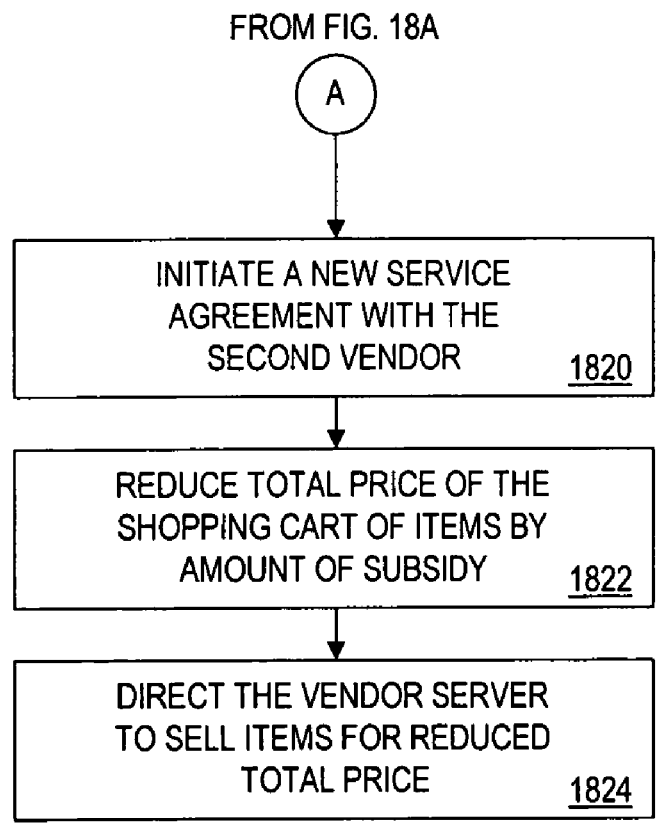

Referring to FIGS. 18A and 18B, a flow chart 1800 illustrates another embodiment of a method for providing an offer for a benefit to a customer that is to purchase items from a first vendor. The controller 110 receives a signal via the vendor server indicating that the customer is ready to "check out" his virtual "shopping cart" of items on a web site of the first vendor (step 1802). As is understood by those skilled in the art, a shopping cart of items on a web site defines a set of items the customer desires to purchase. Checking out the shopping cart indicates a desire to proceed with purchasing the selected items. Those skilled in the art will understand that there are still other ways for a customer to indicate that he is to purchase items.

Before the customer purchases the items, the controller 110 transmits to the vendor server an offer for a reduction in the total price in exchange for signing up for a service with a second vendor (step 1804). For example, the service may be telephone service, Internet service, banking services, credit card account services, insurance service, securities trading service, satellite television service, or cable television service. Accordingly, the second vendor would be a provider of such services, and the customer would be requested to participate in a transaction (e.g. initiate a service agreement with) with the second vendor.

Subsequently, a response from the customer is received (step 1806) via the vendor server. If it is determined that the offer is not accepted (step 1808), then the transaction is processed conventionally (step 1810). If however it is determined that the offer is accepted (step 1808), then a current service provider of the customer (i.e. a party that provides a specified service to the customer) is determined (step 1812). The customer may be asked to provide information of the current provider, or this information may be determined from other sources. For example, one or more databases may be accessed to determine the long distance telephone service provider of the customer. Alternatively, the second vendor may allow access to a database of its existing customers to ascertain whether the customer is included in that database.

If it is determined that the customer has a service provider (step 1814), and it is determined that the second vendor already provides the customer with the specified service (step 1816), then the transaction is processed conventionally (step 1810). If it is determined that the customer has a service provider (step 1814), but it is determined that the second vendor does not provide the customer with the specified service (step 1816), then the customer must have a service agreement with another service provider. Accordingly, the existing service agreement is canceled (step 1818).

If it is determined that the customer does not have a service provider of the specified service at all (step 1814), (or if the controller 110 will cancel or has canceled the existing service agreement) then a new service agreement is initiated with the second vendor (step 1820). Thus, the second vendor has acquired a new customer, either by signing up the customer for a new service or by switching providers of the specified service that is provided to the customer. In exchange, the total price of the shopping cart of items is reduced by the amount of the subsidy (step 1822), and controller 110 directs the vendor server to sell the items for this reduced total price (step 1824).

Figure 19:
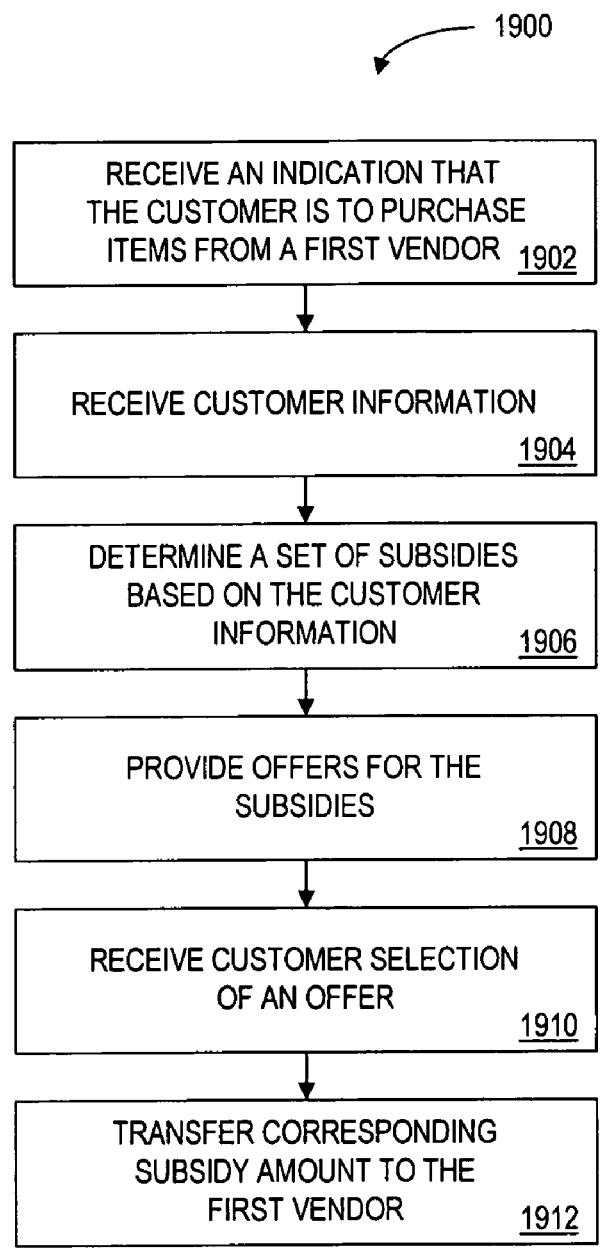
FIG. 19 is a flow chart illustrating another embodiment of a method for providing an offer for a benefit to a customer.

Referring to FIG. 19, a flow chart 1900 illustrates another embodiment of a method for providing an offer for a benefit to a customer that is to purchase items from a first vendor. The controller 110 receives an indication that the customer is ready to purchase items from a first vendor (step 1902). The controller 110 may also receive customer information (step 1904), as described above. The customer information may comprise, for example, a location of the customer or a current service provider of the customer.

A set of subsidies for which the customer may be eligible is determined (step 1906). In one embodiment, the set of subsidies is determined based on customer information. For example, upon reference to the customer information, one or more offer rules may be satisfied. The subsidies corresponding to the satisfied rules would then be included in the set of subsidies. In another embodiment, the offer rules may be satisfied without reference to customer information. For example, an offer rule may be satisfied if the total price of the items (or the price of any of the item) is greater than (or less than) a predetermined threshold. An offer rule may also be satisfied if a particular item is purchased. In yet another embodiment, one or more subsidizing vendors may be contacted, customer information may be transmitted to the subsidizing vendors, and in response the subsidizing vendors may transmit to the controller 110 a description of a subsidy to offer. In still another embodiment, a subsidizing vendor may be selected (e.g. based on a preferential ranking) and a subsidy from this subsidizing vendor is selected.

Offers for each of the subsidies may be provided to the customer (step 1908) for the customer to select one (or more). For example, each offer may be listed on a web page, and the customer must click a hyperlink corresponding to his desired offer. The offers may be provided substantially simultaneously, allowing the customer to evaluate all offers before selecting an offer. Alternatively, the offers may be provided sequentially to the customer. In such an embodiment, the customer would be provided with additional offers only after rejecting one or more offers provided to him. The order in which offers are provided may be determined by the rank of each subsidizing vendor that provides the offer. The controller 110 may ascertain the rank of each offer by referencing the field 728 (FIG. 7) for each subsidizing vendor that provides the offer. The offers could then be provided in a sequence defined by the rank of each offer.

The customer selection is received (step 1910) and the corresponding subsidy amount is transferred to the first vendor (step 1912). Alternatively, the customer may be similarly prompted to select a vendor from a plurality of vendors, and the customer would subsequently be provided with an offer for a subsidy from the selected vendor.

The controller 110 may select one (or more) offers to provide to a customer based on various criteria. For example, the offer with the highest historical acceptance rate may be selected. The historical acceptance rate may be calculated based on data derived from the fields 1022 and 1024 (FIG. 10). Similarly, the offer with the highest profit (e.g., to the vendor or subsidizing vendor) may be selected.

The customer may select two or more offers, thereby generally receiving more of a benefit than if he had selected only one offer. For example, the customer may select offers that require him to (i) sign up for a particular credit card account, (ii) sign up for a particular satellite television service, and (iii) switch to a new provider of cellular telephone service. The controller 110 could charge the accounts of each of three subsidizing vendors, and the aggregate amount charged could be used to reduce the price charged to a customer for a purchase.

The customer described herein may, in one embodiment, comprise a group of customers such as a group dining at a restaurant. In such an embodiment, an offer may be accepted by a plurality of customers. For example, if an offer for a subsidy includes a $75 subsidy amount, then if two customers accept the price of the purchase may be reduced by $150 ($150=$75×2).

Figure 20A:
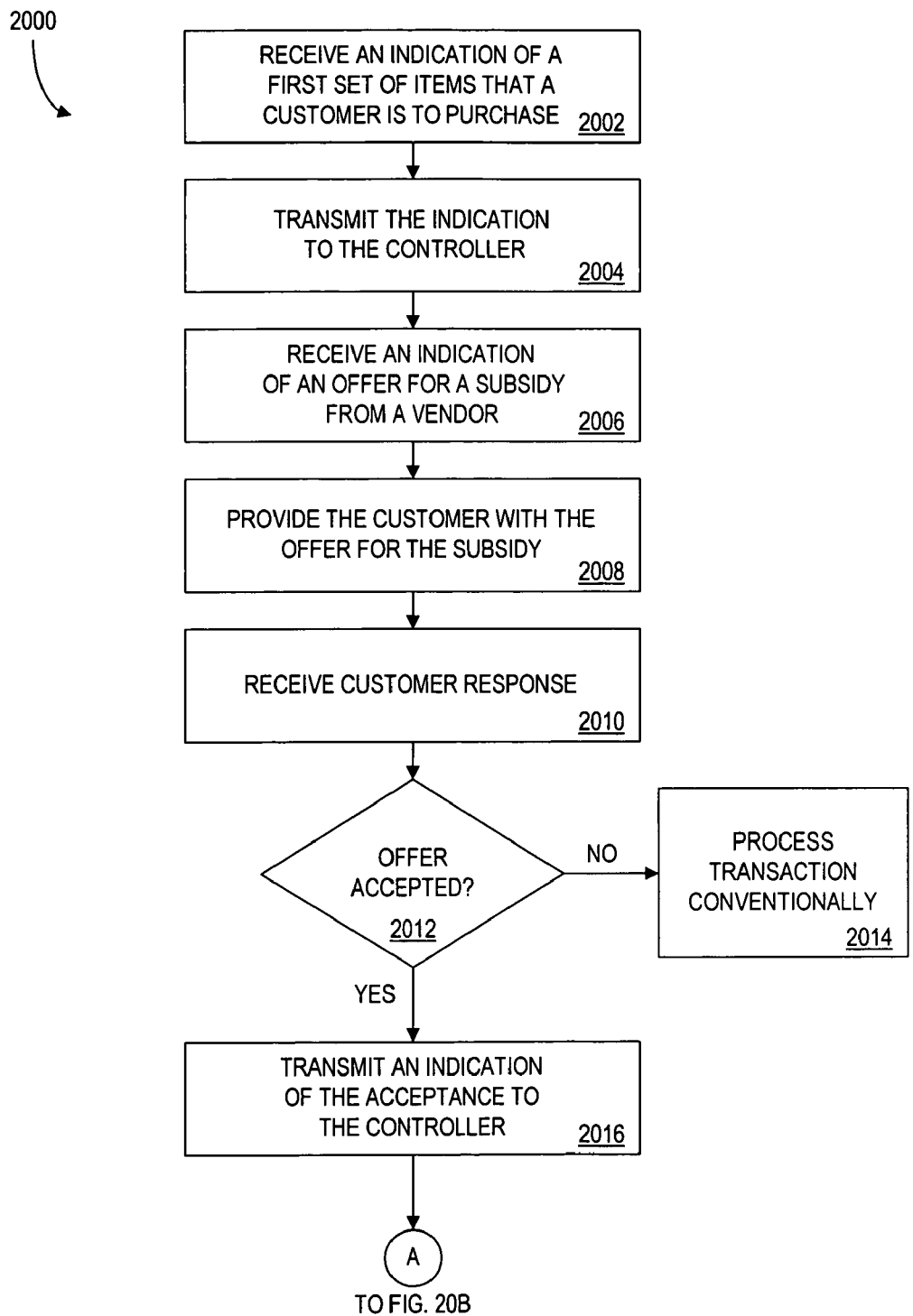
FIGS. 20A and 20B are a flow chart illustrating another embodiment of a method for providing an offer for a benefit to a customer.
Figure 20B:
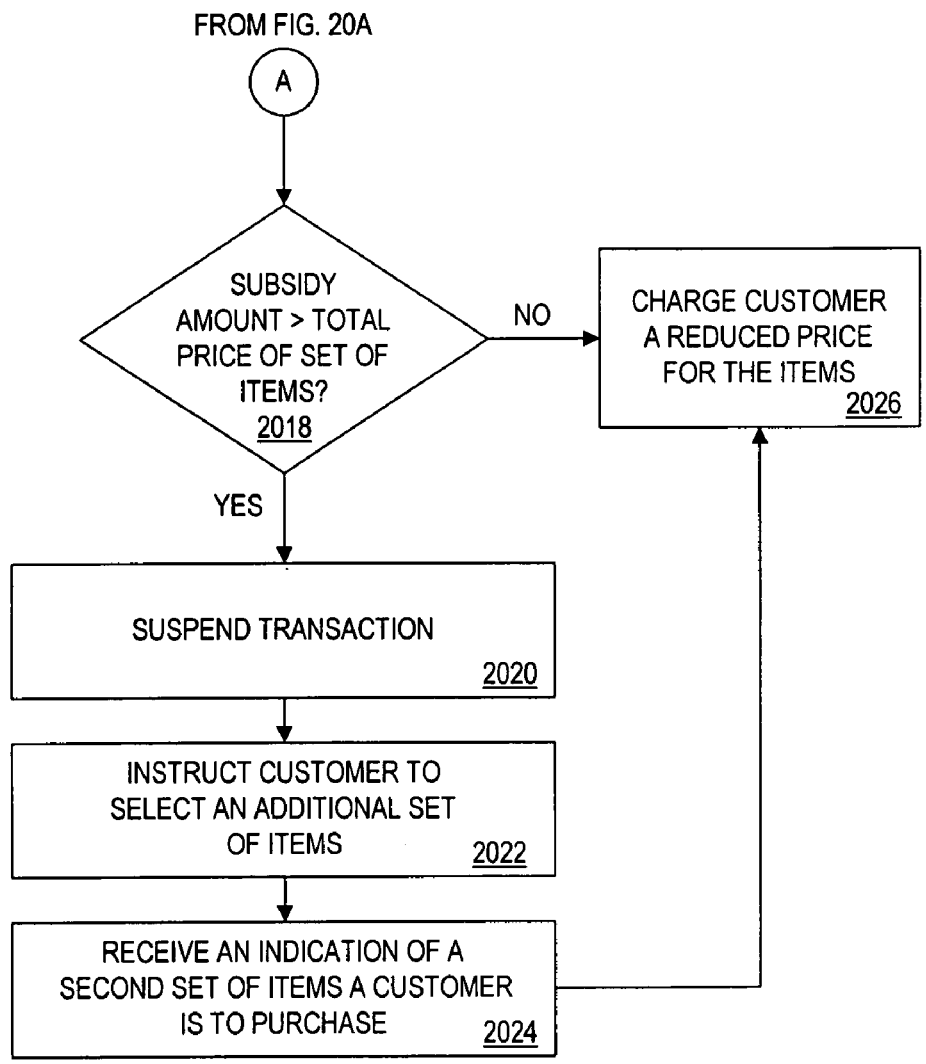

Referring to FIGS. 20A and 20B, a flow chart 200 illustrates another embodiment of a method for providing an offer for a benefit to a customer that is to purchase items from a first vendor. Specifically, in the illustrated embodiment a customer may be allowed to add more items if a subsidy amount of an offer exceeds the total price of the items he had already selected.

The vendor server receives an indication that the customer is to purchase a first set of items from the vendor (step 2002). The vendor server then transmits the indication of the items to the controller 110 (step 2004). In response, the controller 110 transmits and the vendor server receives an indication of an offer for a subsidy from a subsidizing vendor (step 2006). This indication may include an indication of a subsidy amount.

The vendor server provides the customer with an offer for a subsidy (step 2008). A response to the offer is received (step 2010). If it is determined that the offer is not accepted (step 2012), then the transaction is processed conventionally (step 2014).

If it is determined that the offer is accepted (step 2012), then an indication of the acceptance is transmitted to the controller 110 (step 2016). If the subsidy amount is greater than the total price of the set of items (step 2018), then the transaction is suspended (step 2020) and the customer is instructed to select an additional set of items (step 2022). The customer may be instructed in the same way the customer may be provided with an offer for a subsidy. For example, a POS terminal may display a textual representation of the instructions, which is read by the customer or read to the customer by a cashier. In another embodiment, a web page may display text describing the instructions.

Subsequently, the vendor server receives an indication of a second set of items the customer has selected (step 2024). The second set and the first set are then purchased for a reduced purchase price. The customer is charged a reduced price (step 2026) which may be zero (e.g. if the subsidy amount exceeds the sum of the prices of the first and second sets of items).

Referring to FIG. 21, a table 2100 illustrates data used in another embodiment of the present invention in which a subsidy amount may be applied over time. The table 2100 represents information that may be stored in the customer database 230 and/or the customer database 330. Use of the information in the table 2100 is described in detail below with respect to FIG. 22. A customer identifier 2102 uniquely identifies a customer who is due to receive the subsidy amount over time. Credit card information 2104, such as a credit card number and account type, specify an account which may be repeatedly credited to grant the customer the benefit due. The number of credits remaining 2106, frequency 2108 and next credit date 2110 specify when the customer may receive another credit to his account. The amount credited to the specified credit card account is indicated by reference numeral 2112.

Figure 22:
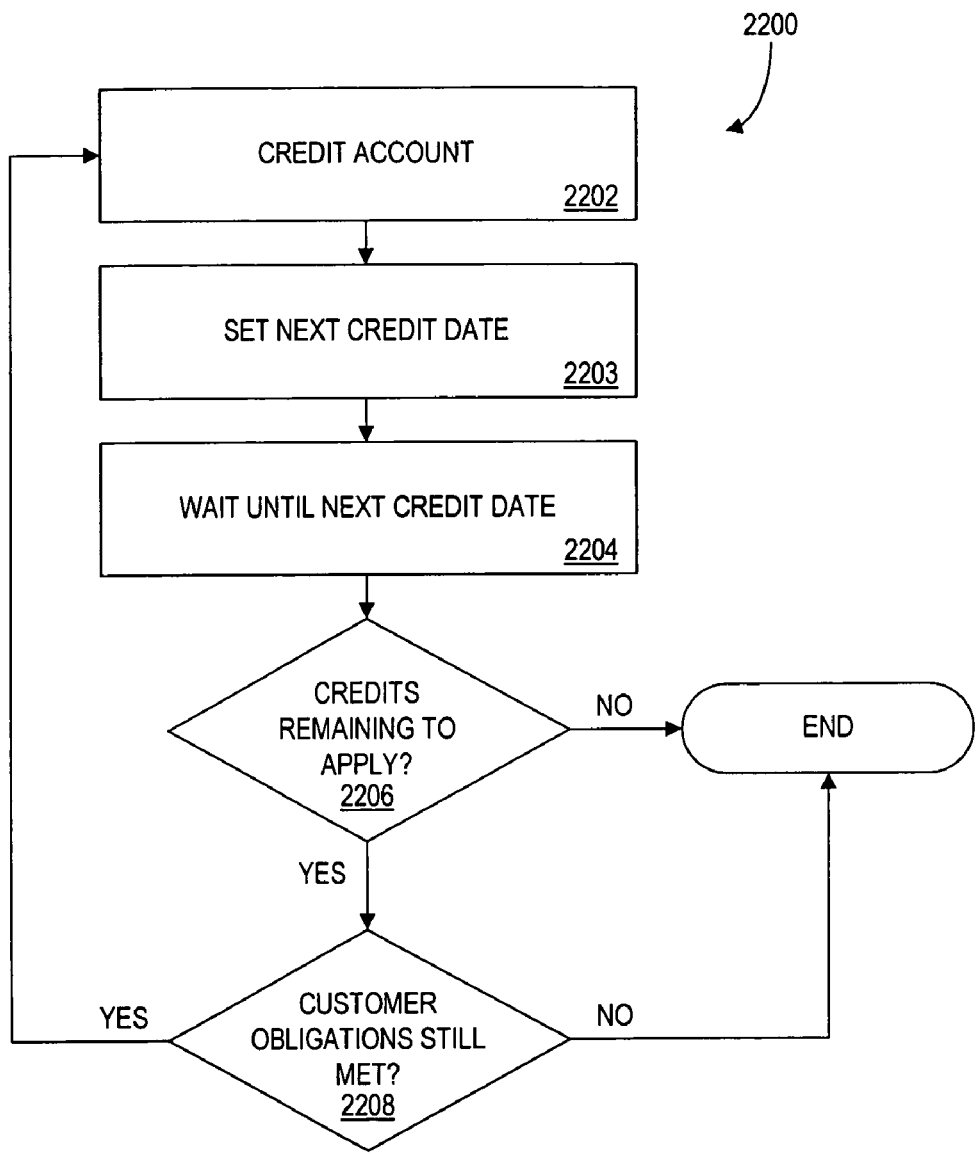
FIG. 22 is a flow chart illustrating another embodiment of a method for providing an offer for a benefit to a customer.

Referring to FIG. 22, a flow chart 2200 illustrates another embodiment of a method for providing an offer for a benefit to a customer. Specifically, in the illustrated embodiment a subsidy amount is applied over time by repeatedly crediting a credit card account. After the credit card account is credited (step 2202), the controller 110 sets the next credit date (step 2203) which may be readily calculated from the current date and the frequency 2108 (FIG. 21). The controller 110 then waits until the next credit date (step 2204) and determines whether there are any more credits to apply (step 2206). If there are more credits remaining, then the controller 110 also determines whether the customer has met all of his obligations (step 2208). For example, the customer may have been required to sign up for and maintain a cellular telephone account with a particular subsidizing vendor. In such a situation, the controller 110 would determine whether the customer has canceled the required cellular telephone account. If all obligations have been met by the customer, then the account is credited again (step 2202).

In the above embodiment, additional or unused subsidy amounts may be, e.g., presented to the customer in the form of a store credit (applied against future purchases from the vendor). Alternatively, the unused subsidy amounts may be forfeited.

Although the present invention has been described with respect to a preferred embodiment thereof, those skilled in the art will note that various substitutions may be made to those embodiments described herein without departing from the spirit and scope of the present invention.

What is claimed is:

1. A method, comprising the steps of:
receiving an indication of at least one item that a customer is to purchase from a first vendor via a web site;
selecting, by a controller in communication with at least one vendor server, a subsidy from a plurality of subsidies;
transmitting, by the controller in response to the received indication of the at least one item, an indication of an offer for the subsidy from a second vendor, the step of transmitting an indication of the offer being performed before the at least one item is purchased;
receiving an indication that the customer accepts the offer;
receiving a first amount of funds from the second vendor;
providing a second amount of funds to the first vendor,
in which the second amount of funds is based on the first amount of funds; and
facilitating, via the controller, a transaction between the customer and the second vendor.

2. A method, comprising the steps of:
receiving an indication of at least one item that a customer is to purchase from a first vendor via a web site;
selecting, by a controller in communication with at least one vendor server, a subsidy from a plurality of subsidies;
transmitting, by the controller in response to the received indication of the at least one item, an indication of an offer for the subsidy from a second vendor, the step of transmitting an indication of the offer being performed before the at least one item is purchased;
receiving an indication that the customer accepts the offer;
receiving a first amount of funds from the second vendor;
providing a second amount of funds to the first vendor,
in which the second amount of funds is derived directly or indirectly from the first amount of funds; and
facilitating, via the controller, a transaction between the customer and the second vendor,
in which the second amount of funds is based on a price associated with the purchase.

3. A method, comprising the steps of:
receiving an indication of at least one item that a customer is to purchase from a first vendor via a web site;
selecting, by a controller in communication with at least one vendor server, a subsidy from a plurality of subsidies;
transmitting, by the controller in response to the received indication of the at least one item, an indication of an offer for the subsidy from a second vendor, the step of transmitting an indication of the offer being performed before the at least one item is purchased;
receiving an indication that the customer accepts the offer;
receiving a first amount of funds from the second vendor;
providing a second amount of funds to the first vendor,
in which the second amount of funds is derived directly or indirectly from the first amount of funds; and
facilitating, via the controller, a transaction between the customer and the second vendor,
determining the second amount of funds based on a price associated with the purchase.

4. A data storage device storing instructions that when performed by a processor direct the processor to perform:
receiving an indication of at least one item that a customer is to purchase from a first vendor via a web site;
selecting, by a controller in communication with at least one vendor server, a subsidy from a plurality of subsidies;
transmitting, by the controller in response to the received indication of the at least one item, an indication of an offer for the subsidy from a second vendor, the step of transmitting an indication of the offer being performed before the at least one item is purchased;
receiving an indication that the customer accepts the offer;
receiving a first amount of funds from the second vendor;
providing a second amount of funds to the first vendor,
in which the second amount of funds is based on the first amount of funds; and
facilitating, via the controller, a transaction between the customer and the second vendor.

5. An apparatus comprising:
a processor; and
a data storage device in communication with the processor, the data storage device storing instructions that when performed by the processor direct the processor to perform:
receiving an indication of at least one item that a customer is to purchase from a first vendor via a web site;
selecting a subsidy from a plurality of subsidies;
transmitting in response to the received indication of the at least one item, an indication of an offer for the subsidy from a second vendor, the step of transmitting an indication of the offer being performed before the at least one item is purchased;
receiving an indication that the customer accepts the offer;
receiving a first amount of funds from the second vendor;
providing a second amount of funds to the first vendor,
in which the second amount of funds is based on the first amount of funds; and
facilitating a transaction between the customer and the second vendor.

6. A system comprising:
at least one vendor server;
at least one subsidizing vendor server; and
a controller in communication with the at least one vendor server and with the at least one subsidizing vendor server, the controller comprising a data storage device storing instructions that when performed by the controller direct the controller to perform:
receiving from a vendor server associated with a first vendor an indication of at least one item that a customer is to purchase from the first vendor;
selecting a subsidy from a plurality of subsidies;
transmitting to the vendor server, in response to the received indication of the at least one item, an indication of an offer for the subsidy from a second vendor, the step of transmitting an indication of the offer being performed before the at least one item is purchased;
receiving from the vendor server an indication that the customer accepts the offer;
receiving a first amount of funds from the second vendor via a subsidizing vendor server associated with the second vendor;
providing a second amount of funds to the first vendor via the vendor server,
in which the second amount of funds is based on the first amount of funds; and
facilitating a transaction between the customer and the second vendor.

7. The method of claim 1, in which the step of selecting a subsidy from a plurality of subsidies comprises:
selecting a vendor from a plurality of vendors; and
selecting a subsidy from the selected vendor.

8. The method of claim 1, in which the step of selecting a subsidy from a plurality of subsidies comprises:
selecting a subsidy from a plurality of subsidies based on the at least one item.

9. The method of claim 1, in which the step of selecting a subsidy from a plurality of subsidies comprises:
selecting at least two subsidies from a plurality of subsidies based on the at least one item.

10. The method of claim 1, in which the step of transmitting an indication of the offer for the subsidy from the second vendor comprises:
transmitting an indication of at least two offers for subsidies from a second vendor.

11. The method of claim 1, in which the step of receiving the first amount of funds from the second vendor comprises:
charging the first amount to an account corresponding to the second vendor.

12. The method of claim 1, in which the step of receiving the first amount of funds from the second vendor comprises:
initiating a transfer of funds from an account corresponding to the second vendor.

13. The method of claim 1, in which the step of providing the second amount of funds to the first vendor comprises:
crediting an account corresponding to the first vendor.

14. The method of claim 1, in which the step of providing the second amount of funds to the first vendor comprises:
initiating a transfer of funds to an account corresponding to the first vendor.

15. The method of claim 1, in which the step of transmitting an indication of an offer comprises:
transmitting an indication of an offer for a subsidy from a plurality of vendors;
and in which the step of receiving a first amount of funds from the second vendor comprises:
receiving a portion of the first amount of funds from each of the plurality of vendors;
and in which the step of facilitating a transaction comprises:
facilitating transactions between the customer and the plurality of vendors.

16. The method of claim 1, in which the step of receiving the first amount of funds from the second vendor comprises:
charging a third amount to a first account corresponding to the second vendor; and
charging a fourth amount to a second account corresponding to a third vendor,
in which the first amount is a sum of the third amount and the fourth amount.

17. The method of claim 1, in which the step of receiving the first amount of funds from the second vendor comprises:
initiating a transfer of a third amount of funds from a first account corresponding to the second vendor; and
initiating a transfer of a fourth amount of funds from a second account corresponding to a third vendor,
in which the first amount is a sum of the third amount and the fourth amount.

18. The method of claim 1, further comprising:
calculating the second amount of funds based on the first amount of funds.

19. The method of claim 1, in which the second amount of funds is based on a predetermined amount less than the first amount of funds.

20. The method of claim 1, in which the second amount of funds is based on a predetermined percentage of the first amount of funds.

21. The method of claim 1, in which the indication of the offer for the subsidy comprises:
an indication of a subsidy amount, and
an indication of a transaction the customer is required to perform in exchange for receiving the subsidy amount.

22. The method of claim 1, further comprising:
determining the second amount of funds based on the first amount of funds.

23. The method of claim 1, in which the second amount of funds is based on the first amount of funds and a price associated with the purchase.

24. The method of claim 1, further comprising:
determining the second amount of funds based on the first amount of funds and a price associated with the purchase.

25. The method of claim 1, in which the second amount of funds is greater than the first amount of funds.

26. The method of claim 1, in which the second amount of funds is not greater than the first amount of funds.

27. The method of claim 1, in which the second amount of funds comprises funds retained from a plurality of transactions.

28. The method of claim 1, further comprising:
providing a predetermined amount of the first amount of funds to a central service.

29. The method of claim 8, in which the step of selecting a subsidy from a plurality of subsidies comprises:
selecting a subsidy from a plurality of subsidies based on a price of the at least one item.

30. The method of claim 10, further comprising:
receiving from the customer a selection of at least one offer of the at least two offers.

* * * * *